(12) United States Patent
Xiang

(10) Patent No.: US 12,347,016 B2
(45) Date of Patent: Jul. 1, 2025

(54) IMAGE RENDERING METHOD AND APPARATUS, DEVICE, MEDIUM, AND COMPUTER PROGRAM PRODUCT

(71) Applicant: Tencent Technology (Shenzhen) Company Limited, Shenzhen (CN)

(72) Inventor: Guannan Xiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 452 days.

(21) Appl. No.: 17/983,307

(22) Filed: Nov. 8, 2022

(65) Prior Publication Data

US 2023/0053462 A1  Feb. 23, 2023

Related U.S. Application Data

(63) Continuation of application No. PCT/CN2022/078563, filed on Mar. 1, 2022.

(30) Foreign Application Priority Data

Mar. 19, 2021 (CN) .......................... 202110295463.5

(51) Int. Cl.
*G06T 15/04* (2011.01)
*G06T 7/11* (2017.01)
(Continued)

(52) U.S. Cl.
CPC ............... *G06T 15/04* (2013.01); *G06T 7/11* (2017.01); *G06T 7/40* (2013.01); *G06T 15/80* (2013.01);
(Continued)

(58) Field of Classification Search
CPC ... G06T 15/04; G06T 7/11; G06T 7/40; G06T 15/80; G06T 2207/20164; G06V 20/10
See application file for complete search history.

(56) References Cited

U.S. PATENT DOCUMENTS

2015/0213572 A1  7/2015 Loss
2017/0039755 A1*  2/2017 Heggelund ........... G06T 15/005
(Continued)

FOREIGN PATENT DOCUMENTS

CN  106997612 A  8/2017
CN  108573524 A  9/2018
(Continued)

OTHER PUBLICATIONS

Martin Andersson, Implement Virtual Texturing, Bacherlor's Thesis, Lulea University of Technology (Year: 2010).*
(Continued)

*Primary Examiner* — Phuc N Doan
(74) *Attorney, Agent, or Firm* — Morgan, Lewis & Bockius LLP

(57) ABSTRACT

Provided is an image rendering method performed by a computer device, the method including: determining a vertex coordinate of a virtual texture tile corresponding to an image in a virtual texture; loading, through a vertex shader, a physical texture corresponding to the vertex coordinate to a texture cache; determining, through the vertex shader for each rendering child tile in the virtual texture tile corresponding to the vertex coordinate, a physical texture coordinate corresponding to each rendering child tile in the texture cache, and transmitting the physical texture coordinate to a pixel shader; and sampling, through the pixel shader, a texel matched with the physical texture coordinate from the physical texture in the texture cache, and rendering, based on the texel, the image.

17 Claims, 10 Drawing Sheets

(51) Int. Cl.
  *G06T 7/40* (2017.01)
  *G06T 15/80* (2011.01)
  *G06V 20/10* (2022.01)
(52) U.S. Cl.
  CPC .... *G06V 20/10* (2022.01); *G06T 2207/20164* (2013.01)

(56) References Cited

U.S. PATENT DOCUMENTS

2017/0200301 A1* 7/2017 Boissé ................... G06T 17/05
2017/0243390 A1* 8/2017 Cerny .................... G06T 17/10

FOREIGN PATENT DOCUMENTS

| CN | 111080806 | A | 4/2020 | |
|---|---|---|---|---|
| CN | 111105491 | A | 5/2020 | |
| CN | 112288873 | A | 1/2021 | |
| CN | 112884875 | A | 6/2021 | |
| GB | 2593588 | * | 9/2021 | ............... G06T 1/20 |

OTHER PUBLICATIONS

Tencent Technology, ISR, PCT/CN2022/078563, May 11, 2022, 2 pgs.
Tencent Technology (Shenzhen) Company Limited, WO, PCT/CN2022/078563, May 11, 2022, 5 pgs.
Tencent Technology (Shenzhen) Company Limited, IPRP, PCT/CN2022/078563, Sep. 12, 2023, 6 pgs.

* cited by examiner

IMAGE RENDERING METHOD AND APPARATUS, DEVICE, MEDIUM, AND COMPUTER PROGRAM PRODUCT

CROSS-REFERENCE TO RELATED APPLICATIONS

This application is a continuation application of PCT Patent Application No. PCT/CN2022/078563, entitled "IMAGE RENDERING METHOD AND APPARATUS, DEVICE, MEDIUM, AND COMPUTER PROGRAM PRODUCT" filed on Mar. 1, 2022, which claims priority to Chinese Patent Application No. 202110295463.5, filed with the State Intellectual Property Office of the People's Republic of China on Mar. 19, 2021, and entitled "IMAGE RENDERING METHOD AND APPARATUS, COMPUTER DEVICE, AND STORAGE MEDIUM", all of which are incorporated herein by reference in their entirety.

FIELD OF THE TECHNOLOGY

This application relates to the field of image processing technology, and particularly to an image rendering method and apparatus, a device, a medium, and a computer program product.

BACKGROUND OF THE DISCLOSURE

Texture in computer graphics represents one or several two-dimensional images of surface details of an object, also referred to as textures. Any type of texture may be applied to one or more surfaces of a three-dimensional model, such as patterns of bricks, leaves, and floors. Textures improve the authenticity of a scene.

In the related art, a virtual texture technology is usually used to divide an overlarge virtual texture (i.e., a virtual texture) into multiple small tiles and generate an indirection texture, so as to obtain a position of a real texture (i.e., a physical texture) corresponding to a position of each page tile in each virtual texture from the indirection texture when rendering. However, in this manner, a sampling calculation process of textures is relatively complex, and the resource consumption on some terminals with relatively low performance is relatively high. As a result, the image rendering efficiency is relatively low.

SUMMARY

This application provides an image rendering method and apparatus, a computer device, a storage medium, and a computer program product.

In an aspect, this application provides an image rendering method, applied to a computer device, the method including:
  determining a vertex coordinate of a virtual texture tile corresponding to an image in a virtual texture;
  loading, through a vertex shader, a physical texture corresponding to the vertex coordinate to a texture cache;
  determining, through the vertex shader for each rendering child tile in the virtual texture tile corresponding to the vertex coordinate, a physical texture coordinate corresponding to each rendering child tile in the texture cache;
  transmitting the physical texture coordinate to a pixel shader; and
  sampling, through the pixel shader, a texel matched with the physical texture coordinate from the physical texture in the texture cache, and rendering, based on the texel, the image.

In another aspect, this application provides an image rendering apparatus, including:
  a data obtaining module, configured to determine a vertex coordinate of a virtual texture tile corresponding to an image in a virtual texture, and
  a texture obtaining module, configured to load, through a vertex shader, a physical texture corresponding to the vertex coordinate to a texture cache;
  a physical texture coordinate determining module, configured to determine, through the vertex shader for each rendering child tile in the virtual texture tile corresponding to the vertex coordinate, a physical texture coordinate corresponding to each rendering child tile in the texture cache;
  a data transmission module, configured to transmit the physical texture coordinate to a pixel shader; and
  an image rendering module, configured to sample, through the pixel shader, a texel matched with the physical texture coordinate from the physical texture in the texture cache, and render, based on the texel, the image.

In another aspect, this application provides a computer device, which includes a memory and one or more processors, the memory stores computer-readable instructions, and the computer-readable instructions, when being executed by the one or more processors, implementing the following steps:
  determining a vertex coordinate of a virtual texture tile corresponding to an image in a virtual texture;
  loading, through a vertex shader, a physical texture corresponding to the vertex coordinate to a texture cache;
  determining, through the vertex shader for each rendering child tile in the virtual texture tile corresponding to the vertex coordinate, a physical texture coordinate corresponding to each rendering child tile in the texture cache;
  transmitting the physical texture coordinate to a pixel shader; and
  sampling, through the pixel shader, a texel matched with the physical texture coordinate from the physical texture in the texture cache, and rendering, based on the texel, the image.

In another aspect, this application provides one or more computer-readable storage media, storing computer-readable instructions, the computer-readable instructions, when being executed by one or more processors, implementing the following operations:
  determining a vertex coordinate of a virtual texture tile corresponding to an image in a virtual texture;
  loading, through a vertex shader, a physical texture corresponding to the vertex coordinate to a texture cache;
  determining, for each rendering child tile in the virtual texture tile corresponding to the vertex coordinate, a physical texture coordinate corresponding to each rendering child tile in the texture cache;
  transmitting the physical texture coordinate to a pixel shader;
  sampling, through the pixel shader, a texel matched with the physical texture coordinate from the physical texture in the texture cache, and rendering, based on the texel, the image.

In another aspect, this application provides a computer program product, the computer program product including computer-readable instructions, the computer-readable instructions being stored in a computer-readable storage medium; the one or more processors of the computer device read the computer-readable instructions from the computer-readable storage medium, and the one or more processors, when executing the computer-readable instructions, implementing the following operations:

determining a vertex coordinate of a virtual texture tile corresponding to an image in a virtual texture;

loading, through a vertex shader, a physical texture corresponding to the vertex coordinate to a texture cache;

determining, for each rendering child tile in the virtual texture tile corresponding to the vertex coordinate, a physical texture coordinate corresponding to each rendering child tile in the texture cache;

transmitting the physical texture coordinate to a pixel shader; and sampling, through the pixel shader, a texel matched with the physical texture coordinate from the physical texture in the texture cache, and rendering, based on the texel, the image.

Details of one or more embodiments of this application are provided in the accompany drawings and descriptions below. Based on the specification, the accompanying drawings, and the claims of this application, other features, objectives, and advantages of this application become clearer.

DESCRIPTION OF EMBODIMENTS

To make the objectives, technical solutions, and advantages of this application clearer and more understandable, this application is further described in detail below with reference to accompanying drawings and embodiments. It is to be understood that the specific embodiments described herein are only used for explaining this application, and are not used for limiting this application.

Figure 1:
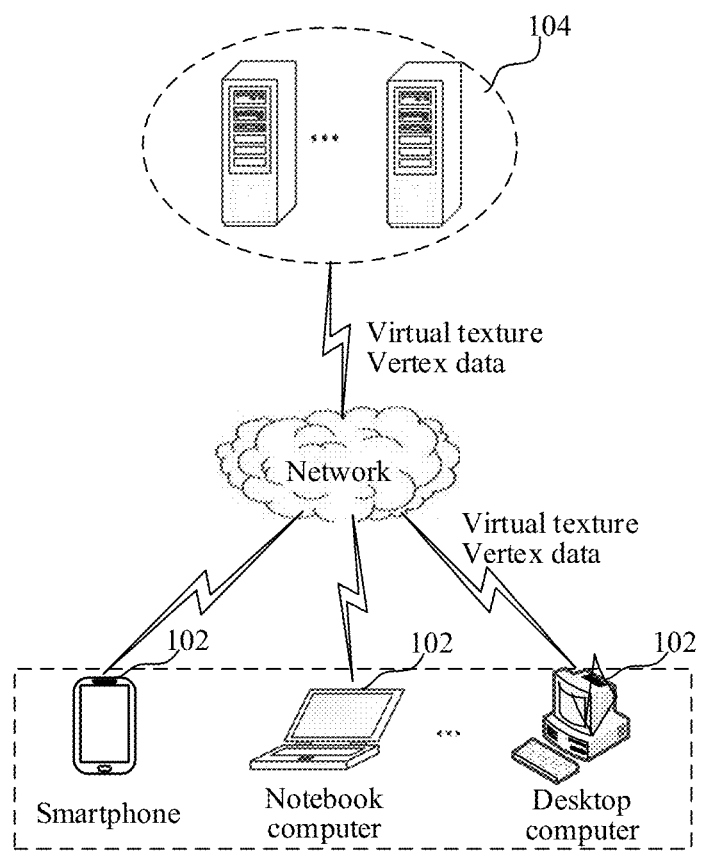
FIG. 1 is a diagram of an application environment of an image rendering method according to an embodiment.

An image rendering method provided in this application may be applied to an application environment shown in FIG. 1. A terminal 102 communicates with a server 104 through a network. Specifically, the terminal 102 may obtain a virtual texture and vertex data in a three-dimensional scene from the server 104. The terminal 102 then determines a vertex coordinate of a virtual texture tile corresponding to an image in the virtual texture, and loads, through a vertex shader, a physical texture corresponding to the vertex coordinate to a texture cache. For each rendering child tile in the virtual texture tile corresponding to the vertex coordinate, a physical texture coordinate corresponding to each rendering child tile in the texture cache is determined. The physical texture coordinate is transmitted to a pixel shader. A texel matched with the physical texture coordinate is sampled through the pixel shader from the physical texture in the texture cache, and the image is rendered based on the texel.

The computer device 102 may be, but not limited to, a desktop computer, a notebook computer, a smart phone, a tablet computer, an on-board terminal, a smart speaker, and a portable wearable device, but is not limited to this. The portable wearable device may be a smart watch, smart glasses, or the like. The server 104 may be implemented by using an independent server or a server cluster that includes a plurality of servers. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal and the server may be directly or indirectly connected in a wired or wireless communication manner. This is not limited in this application.

The image rendering method of this application may relate to an artificial intelligence technology, particularly to a computer vision technology in the artificial intelligence technology. The solution of this application is to perform rendering processing on an image based on the computer vision technology, so as to effectively improve the scene rendering efficiency.

Figure 2:
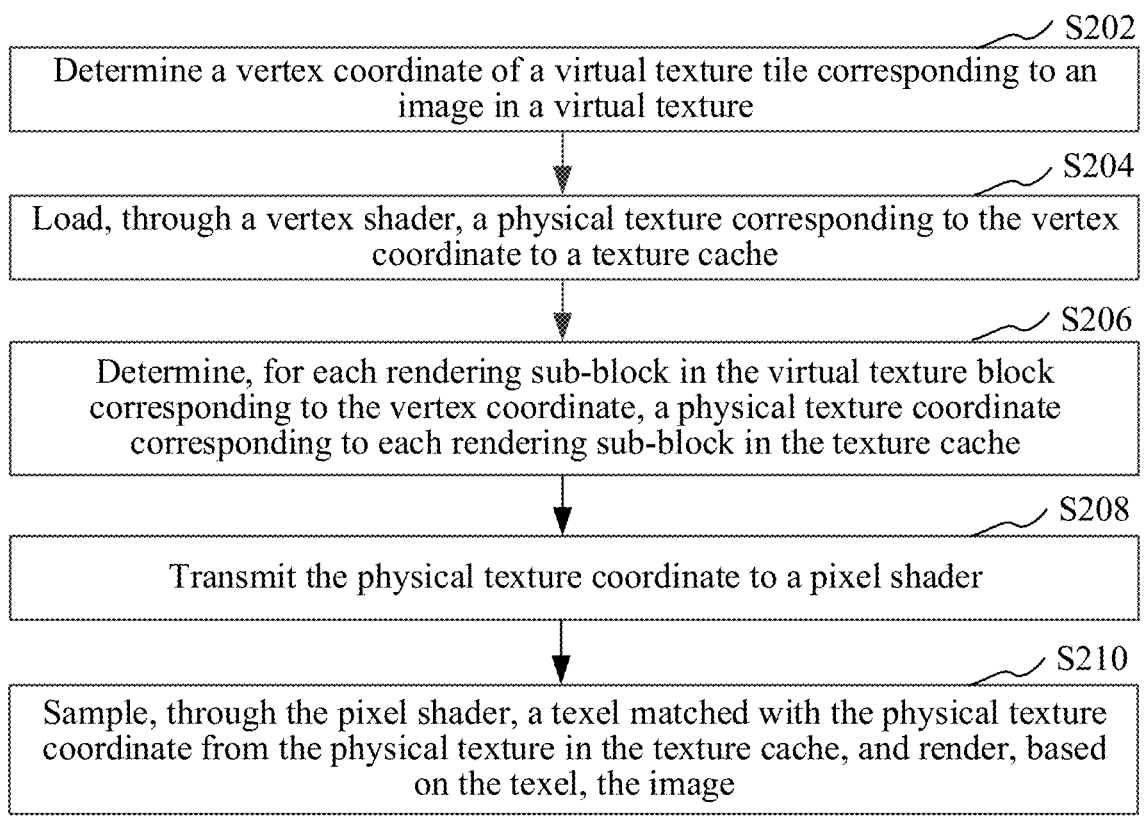
FIG. 2 is a schematic flowchart of an image rendering method according to an embodiment.

In an embodiment, as shown in FIG. 2, there is provided an image rendering method, which is described taking application of the method to the terminal in FIG. 1 as an example. The method may be performed by the terminal alone, or by interaction between the terminal and a server. The following steps are specifically included:

S202: Determine a vertex coordinate of a virtual texture tile corresponding to an image in a virtual texture.

In computer graphics, rendering refers to a process of projecting an object model in a three-dimensional scene into a digital image in two dimensions according to a set environment, material, illumination, and rendering parameter, i.e., a process of converting a three-dimensional light energy transfer process into a two-dimensional image. The scene and an entity are represented in a three-dimensional form, closer to the real world, for ease of manipulation and transformation.

It can be understood that the image may be a scene picture to be displayed in the three-dimensional scene. For example, the three-dimensional scene may particularly be a three-dimensional virtual scene. It can be understood that in the three-dimensional scene, different scene pictures are correspondingly displayed in case of different positions and viewing angles of observation points. Image frames corresponding to consecutive scene pictures may be displayed to display a dynamic three-dimensional scene or three-dimensional scene video. The image may represent an image frame currently required to be rendered in the process of displaying the three-dimensional scene.

Texture represents one or several two-dimensional images of surface details of an object, also referred to as texture images or textures. It can be understood that the texture is actually a two-dimensional array in which elements are some color values. Mapping a texture to a surface of an object in a specific manner may make the object look more realistic. The texture may be used to embody a content included by an object that needs to be rendered to a display image or a video frame.

A texture may store more information. For example, each pixel may record at least one of color, vertex data, normal vector, material, background light, scatter, highlight, transparency, geometric height, geometric displacement, etc., which may be used to depict details of an object surface. The texture may specifically be a pre-drawn texture image. The texture image may include colors and other information corresponding to one or more graphical objects. For example, the graphical object may include at least one of a terrain, house, tree, and person in a three-dimensional scene.

The virtual texture (VT) is suitable for high resolutions. The concept of virtual texture is similar to virtual memory. The virtual texture is usually a super-large texture that is very large. Therefore, during rendering processing, not all the data of the super-large texture is loaded to a memory, but only a required part of region in the super-large texture is loaded to the memory according to a runtime implementation requirement of a three-dimensional scene application.

It can be understood that a physical texture refers to a texture image that is actually present in the memory. That is, a texture in actual texture data loaded to the memory is a physical texture. Texture tile data may specifically be texture tile data corresponding to each virtual texture tile.

In addition, unlike the virtual memory, the virtual texture may not be blocked in runtime, and when data may not be read immediately from a hard disk, a high-level texture in corresponding Mipmap in the memory may be temporarily displayed instead. For example, a map texture may be divided into hierarchical textures of different resolutions, each of which is subdivided into multiple tiles, and closer tiles present higher resolutions in rendering. Then, the tiles are mapped to a physical texture present in the memory based on a preset mapping relationship. When a displayed field of view changes, part of physical textures may be replaced, while part of physical textures may be loaded.

The virtual texture tiles in the virtual texture may be multiple virtual texture tiles obtained by dividing the virtual texture corresponding to the whole scene. It can be understood that multiple refers to at least two or more.

It can be understood that a three-dimensional scene application-based application program is deployed in the terminal, and a rendering engine is deployed in the application program. The rendering engine is a core component or system capable of implementing image rendering. The rendering engine may realize a required image rendering function rapidly, work out all effects such as model, animation, shadow, and special effect in real time, and display the rendering effect on a display screen of the terminal. For example, a rendering engine in a game application program may include Unreal Engine and Unity.

The rendering engine includes a shader. The shader is a piece of algorithm program that a rendering pipeline is interspersed with to implement image rendering, and is responsible for combining input vertex data with an input texture, color, or the like in a specific manner and then outputting the same. In general, a graphics processing unit reads a corresponding input texture through the shader, and a rendering pipeline of the graphics processing unit renders an image.

It can be understood that the three-dimensional scene includes preset vertexes, such as terrain vertexes in a terrain of the three-dimensional scene. The vertex coordinate may be a coordinate corresponding to each vertex in the three-dimensional scene. The coordinate corresponding to each vertex in the three-dimensional scene includes not only a three-dimensional world space coordinate but also a two-dimensional texture coordinate.

The vertex coordinate in the virtual texture may be a texture coordinate corresponding to each vertex in the virtual texture, and may specifically be a UV texture coordinate. The UV coordinate is an abbreviation of a (u, v) texture coordinate, i.e., a UV coordinate, like X, Y, and Z axes of a space model, where U represents a horizontal coordinate of the image, V represents a vertical coordinate of the image, and the direction of W is perpendicular to the surface of the display. The UV coordinate is generally used for procedural texturing or some three-dimensional scene texturing technologies.

It can be understood that the UV coordinate is a basis for mapping of the texture to the surface of the model, and defines positional information of each pixel in the image. These pixels are interrelated to the model in the three-dimensional scene to locate the surface of the texture. That is, each pixel in the image corresponds exactly to the surface of the model object. Any pixel on the image may be located through a two-dimensional UV coordinate system.

Specifically, the virtual texture includes multiple virtual texture tiles that may specifically be obtained by division according to a preset size or number. The terminal may determine a vertex coordinate of each virtual texture tile according to the vertex coordinate of each vertex in the virtual texture.

In one embodiment, the three-dimensional scene includes an overall virtual texture that is divided into multiple virtual textures in the three-dimensional scene. Each virtual texture is further divided into multiple virtual texture tiles. When processing an image, the terminal first determines a virtual texture corresponding to the image, and then determines a vertex coordinate of a virtual texture tile corresponding to the image in the virtual texture.

Figure 3:
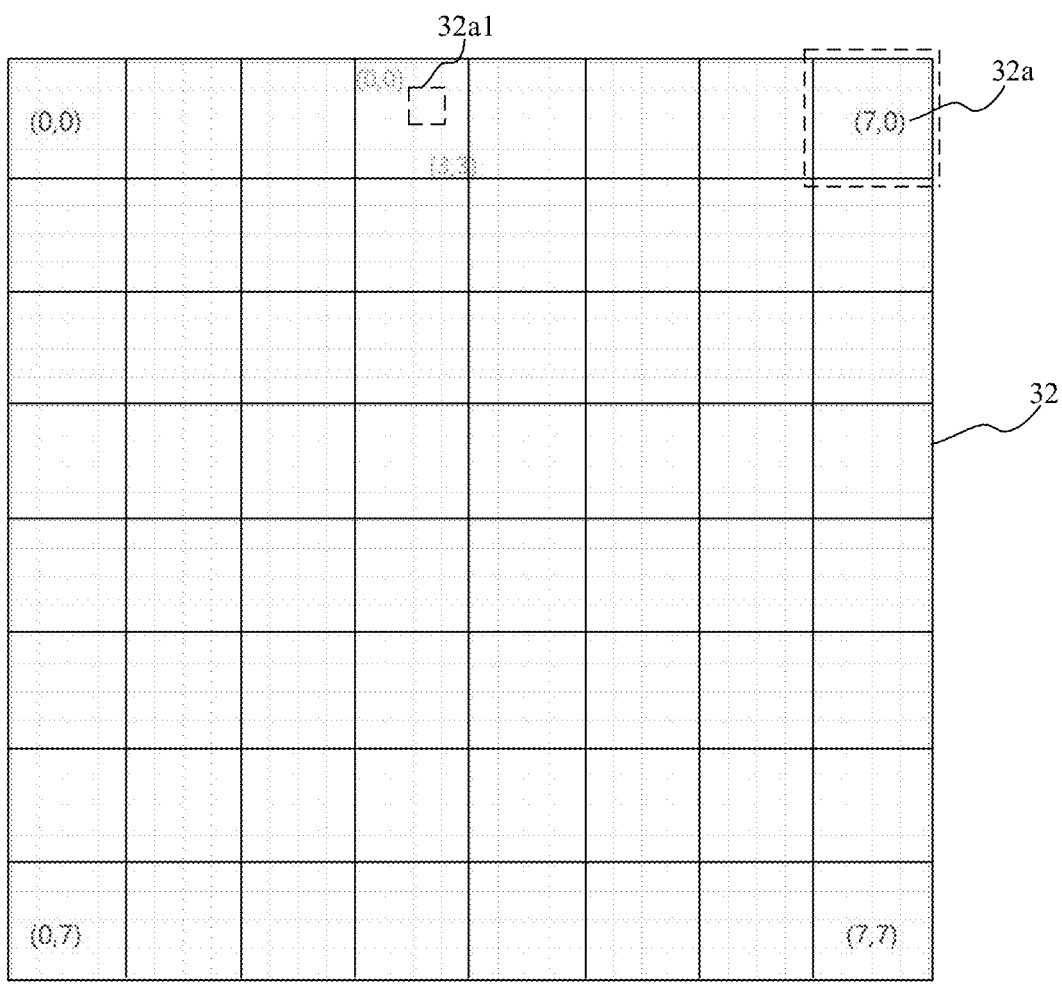
FIG. 3 is a schematic diagram of coordinates of a virtual texture according to an embodiment.

FIG. 3 is a schematic diagram of coordinates of a virtual texture according to an embodiment. The virtual texture 32 includes multiple virtual texture tiles 32a, and each virtual texture tile 32a includes multiple rendering child tiles 32a1. Referring to FIG. 3, an origin coordinate of the virtual texture 32 may be a coordinate (0, 0) corresponding to a top-left vertex. A coordinate of the first virtual texture tile at the top left of the virtual texture 32 may be the vertex coordinate corresponding to the top-left vertex, i.e., (0, 0). A coordinate of the bottom-left virtual texture tile is a vertex coordinate (0, 7) corresponding to a bottom-left vertex. A coordinate of the top-right virtual texture tile is a vertex coordinate (7, 0) corresponding to a top-right vertex. A coordinate of the bottom-right virtual texture tile is a vertex coordinate (7, 7) corresponding to a bottom-right vertex. A coordinate of each rendering child tile in the virtual texture tile may also be a vertex coordinate of a top-left vertex of each rendering child tile in the virtual texture tile. It can be understood that the coordinate of the rendering child tile is a local coordinate in the corresponding virtual texture tile, and is used for representing a position of the rendering child tile in the corresponding virtual texture tile, so that the top-left vertex of the rendering child tile is also referred to as a local vertex coordinate, or a local virtual texture coordinate. For example, the fourth virtual texture tile in the first row includes 4×4 rendering child tiles. In such case, a coordinate of the first rendering child tile at the top left of the virtual texture tile in the virtual texture tile is (0, 0), and a coordinate of the last rendering child tile at the bottom right in the virtual texture tile is (3, 3).

S204: Load, through a vertex shader, a physical texture corresponding to the vertex coordinate to a texture cache.

It can be understood that the shader includes a vertex shader and a pixel shader. The vertex shader is mainly responsible for operational processing of geometric relationships of vertexes, etc. The pixel shader is mainly responsible for operational processing of fragment colors, etc.

The vertex shader is also referred to as a vertex shading engine and a vertex shading device. The vertex shader is a processing unit configured to add various special effects, etc., in the three-dimensional scene. The programmability of the vertex shader allows a developer to adjust various special effects by loading new software instructions. Each vertex may be clearly defined by various data variables, at least including x, y, and z coordinates of each vertex. For example, each vertex may include at least one of color, initial path, material, and light characteristic.

The texture cache is a physical texture cache, also referred to as a texture cache. It can be understood that the texture cache is actually a cache for storing physical textures, so as to directly read texture data therefrom during rendering. Since the virtual texture is relatively large, and hardware of the terminal is generally unable to directly cache too large virtual textures, only a physical texture corresponding to a recently used virtual texture tile is cached to the texture cache, and tiled rendering is performed based on the virtual texture during rendering. Therefore, the runtime rendering efficiency is improved.

It can be understood that there is a mapping relationship between a virtual texture and a physical texture. For example, a correspondence between a virtual texture tile in a virtual texture and a corresponding physical texture may be established through coordinates in different coordinate systems.

After obtaining the vertex coordinate of the virtual texture tile corresponding to the image in the virtual texture, the terminal inputs the obtained vertex coordinate to the vertex shader, so that the vertex shader performs transformation processing on the vertex coordinate. The vertex shader determines, according to a vertex coordinate of each virtual texture tile, a physical texture corresponding to the virtual texture tile so as to load the physical texture to the texture cache.

Specifically, the terminal may perform coordinate transformation on the vertex coordinate of each virtual texture tile through the vertex shader, so as to obtain the physical texture corresponding to each virtual texture tile according to a transformed coordinate. For example, the vertex shader may perform world coordinate transformation on the vertex coordinate of each virtual texture tile to obtain a world coordinate corresponding to the vertex of each virtual texture tile. The terminal obtains the physical texture corresponding to each virtual texture tile according to the world coordinate.

Figure 4:
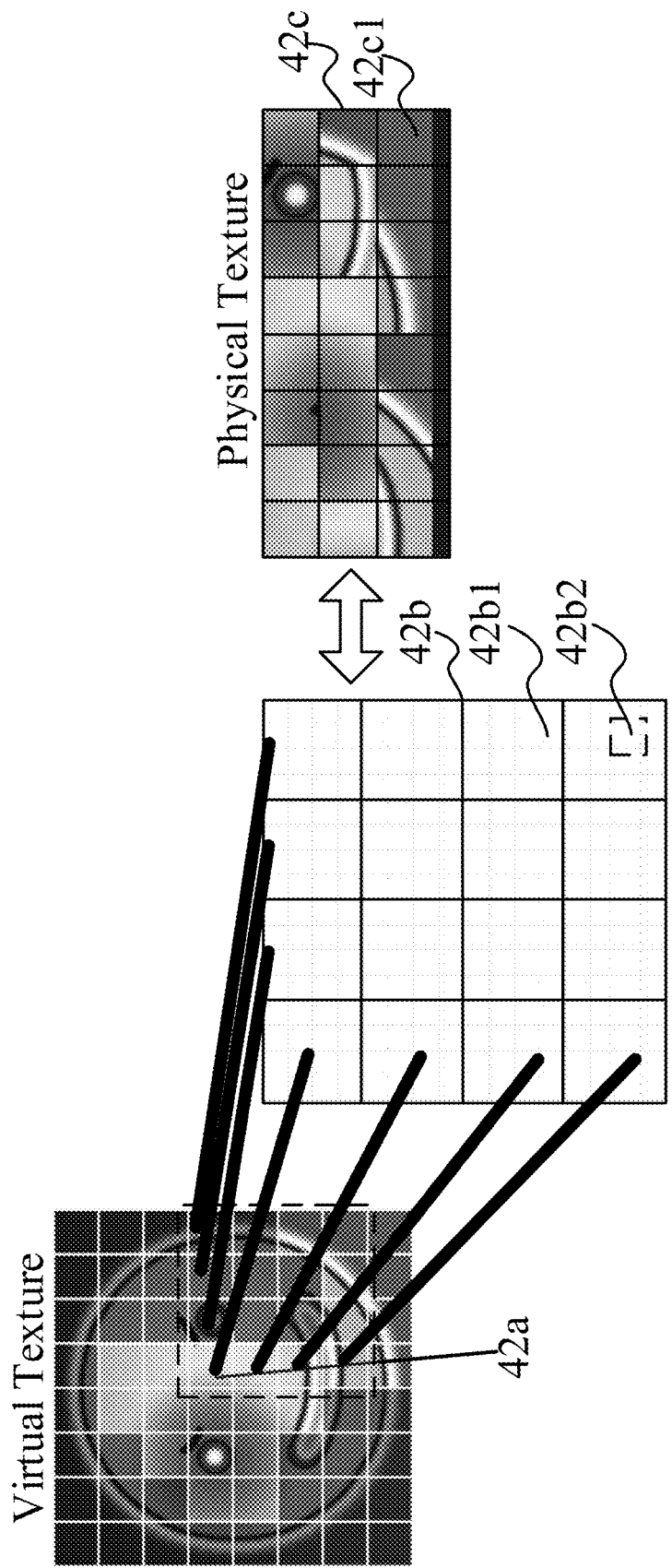
FIG. 4 is a schematic diagram of a virtual texture and a physical texture according to an embodiment.

FIG. 4 is a schematic diagram of a virtual texture and a physical texture according to an embodiment. Referring to FIG. 4, the virtual texture is divided into multiple virtual texture tiles. Taking a virtual texture sample 42a in the virtual texture as an example, the virtual texture sample 42a corresponds to a schematic grid coordinate diagram 42b. In the schematic grid coordinate diagram 42b, there are multiple tiles 42b1 obtained by division, each of which corresponds to a virtual texture tile in the virtual texture sample 42a. The tile 42b1 further includes multiple rendering child tiles 42b2. The rendering child tile may be a grid cell that is a minimum unit for image drawing. After determining a physical texture corresponding to each tile 42b1 according to vertex coordinates through the vertex shader, the terminal loads the physical texture to a physical texture cache 42c. Then, the texture cache 42c includes the physical texture 42c1 corresponding to each tile 42b1.

S206: Determine, for each rendering child tile in the virtual texture tile corresponding to the vertex coordinate, a physical texture coordinate corresponding to each rendering child tile in the texture cache.

The rendering child tiles refer to multiple local child tiles in the virtual texture tile. It can be understood that each rendering child tile is a partial map texture of the virtual texture tile. Specifically, the rendering child tile may be a texture unit for texture sampling and rendering processing, specifically a pixel unit, for example.

The physical texture coordinate is a sampling coordinate or a physical coordinate (physical UV). In the virtual texture, the physical texture coordinate represents a coordinate that texture sampling is to be performed in the texture cache, i.e., a texture sampling coordinate for searching for a texture color value. The physical texture coordinate reflects an actual address corresponding to each rendering child tile in the physical texture.

After loading the physical texture corresponding to the virtual texture tile in the image to the texture cache according to the vertex coordinate, the terminal further calculates the corresponding physical texture coordinate in the texture cache through the vertex shader.

Specifically, each virtual texture tile includes a corresponding vertex coordinate, and each rendering child tile in the virtual texture tile also has a corresponding local vertex coordinate. The local vertex coordinate may refer to a relative position coordinate of the vertex of each rendering child tile in the corresponding virtual texture tile, specifically a vertex coordinate of a top-left vertex of each rendering child tile in the virtual texture tile, for example. Specifically, the local vertex coordinate of the rendering child tile is a local virtual texture coordinate.

The terminal determines an offset of each rendering child tile in the corresponding physical texture according to a position of each rendering child tile of each virtual texture tile in the virtual texture tile and a starting position of the corresponding physical texture, so as to calculate the physical texture coordinate of each rendering child tile in the corresponding physical texture in the texture cache.

S208: Transmit the physical texture coordinate to a pixel shader.

The pixel shader is a set of instructions executed during pixel rendering. Many pixels are rendered in each execution time. The number of pixels depends on the resolution of the screen.

After calculating the physical texture coordinate corresponding to each rendering child tile in the virtual texture tile in the texture cache through the vertex shader, the terminal transmits the physical texture coordinate corresponding to each rendering child tile from the vertex shader to the pixel shader.

For example, the terminal may transmit the physical texture coordinate from the vertex shader to the pixel shader in an attribute interpolation manner. It can be understood that three-dimensional image rendering usually takes a triangle as a minimum drawing unit. It is necessary in a rasterization process to perform attribute interpolation processing on a vertex attribute to obtain a pixel attribute, so as to fill gaps between pixels in image transformation by interpolation processing.

Specifically, when transmitting the physical texture coordinate from the vertex shader to the pixel shader, the terminal also performs attribute interpolation transformation on the physical texture coordinate of a vertex attribute through the vertex shader to obtain a physical texture coordinate of a pixel attribute, and then transmits the physical texture coordinate of the pixel attribute to the pixel shader.

S210: Sample, through the pixel shader, a texel matched with the physical texture coordinate from the physical texture in the texture cache, and render, based on the texel, the image.

The texel refers to a texel value in the texture, which may be a texture color value, for example.

It can be understood that sampling refers to a process of extracting an individual or sample from a whole. A sampled texel may refer to a sampling coordinate obtained by mapping of a vertex coordinate and a texture coordinate. The process of reading a color value on the sampling coordinate from the physical texture is referred to as texture sampling.

After obtaining the physical texture coordinate through the pixel shader, the terminal samples, through the pixel shader, a texel matched with the physical texture coordinate from the physical texture in the texture cache. The pixel shader further calculates a final pixel value of each pixel in the image based on the sampled texel, so as to render the image.

Traditionally, for a runtime virtual texture, a physical texture coordinate for texture sampling is typically calculated in the pixel shader. However, since a relatively large number of textures are required in a relatively large scene, streaming loading requires a large number of textures, and a terminal with relatively low performance samples runtime virtual textures relatively slowly and may not implement efficient rendering.

In this embodiment, the physical texture coordinate is calculated in the vertex shader, so that the pixel shader needs not to calculate the physical texture coordinate. The pixel shader further samples the texel matched with the physical texture coordinate directly from the physical texture in the texture cache according to the physical texture coordinate transmitted by the vertex shader. The calculation of the pixel shader is reduced effectively, and the rendering efficiency is further improved effectively. Even if rendering processing is performed on a terminal or mobile device with relatively low performance, with adoption of the image rendering method of this embodiment, the image rendering efficiency of the terminal or mobile device with relatively low performance may be close to the rendering efficiency of a terminal with high performance, so that images may be rendered efficiently.

In the image rendering method, the terminal determines a vertex coordinate of a virtual texture tile corresponding to an image in the virtual texture, and loads, through a vertex shader, a physical texture corresponding to the vertex coordinate to a texture cache. For each rendering child tile in the virtual texture tile corresponding to the vertex coordinate, a physical texture coordinate corresponding to each rendering child tile in the texture cache is determined, so that the physical texture coordinate corresponding to each rendering child tile may be calculated accurately. The terminal further transmits the physical texture coordinate to a pixel shader. Since the calculation of the vertex shader during rendering is far less than that of the pixel shader, the physical texture coordinate is calculated in the vertex shader, and then the pixel shader needs not to calculate the physical texture coordinate. The pixel shader further samples a texel matched with the physical texture coordinate directly from the physical texture in the texture cache according to the physical texture coordinate transmitted by the vertex shader, and renders, based on the texel, the image. Therefore, the calculation of the pixel shader may be reduced effectively to reduce the resource consumption during image rendering effectively and further improve the rendering efficiency effectively.

In an embodiment, the operation of loading, through a vertex shader, a physical texture corresponding to the vertex coordinate to a texture cache includes: determining, through the vertex shader, a virtual texture coordinate of the virtual texture tile corresponding to the vertex coordinate in a virtual texture coordinate system; obtaining a virtual texture page table, the virtual texture page table storing a mapping relationship between a virtual texture coordinate and a physical texture coordinate, and the physical texture coordinate being a coordinate of a physical texture in a physical texture coordinate system; obtaining a physical texture corresponding to each virtual texture tile according to a physical texture coordinate corresponding to the virtual texture coordinate in the virtual texture page table; and loading the obtained physical texture to the texture cache.

It can be understood that each three-dimensional vertex in the three-dimensional scene has a corresponding two-dimensional texture point. That is, there is pre-established a correspondence between a three-dimensional vertex and a two-dimensional vertex. A texture coordinate of each vertex may be set to map a required part of texture to a geometrical body in the three-dimensional scene. The texture coordinate determines a part of texture to be mapped to a triangle.

It can be understood that coordinate systems in graphics are relative. For example, the coordinate systems may include a world coordinate system, a texture coordinate system, and a screen coordinate system. The texture coordinate system includes a U axis representing a horizontal direction of an image and a V axis representing a vertical direction of the image. A coordinate (u, v) specifies an element in a texture.

A virtual texture coordinate system refers to a two-dimensional texture coordinate system corresponding to a virtual texture, and is used for locating each element in the virtual texture. A physical texture coordinate system refers to a two-dimensional texture coordinate system corresponding to a physical texture, and is used for locating each element in the physical texture.

A virtual texture page table, i.e., page table, is also referred to as an indirection table. The virtual texture page table stores a mapping relationship between a virtual texture coordinate and a physical texture coordinate. Specifically, the virtual texture page table stores a mapping relationship between a virtual texture coordinate corresponding to a vertex of each virtual texture tile and a physical texture coordinate of a starting position of a corresponding physical texture.

After determining the vertex coordinate of the virtual texture tile corresponding to the image in the virtual texture, the terminal inputs the obtained vertex coordinate to the vertex shader, and performs, through the vertex shader, coordinate transformation processing on the vertex coordinate. Specifically, the vertex shader first determines a virtual texture coordinate of the virtual texture tile corresponding to the vertex coordinate in a virtual texture coordinate system.

Then, the terminal obtains a virtual texture page table through the vertex shader, and searches the virtual texture page table for a corresponding physical texture coordinate according to the virtual texture coordinate. The terminal further obtains a physical texture corresponding to each virtual texture tile according to the physical texture coordinate found from the virtual texture page table according to the virtual texture coordinate. Specifically, the terminal may obtain texture data corresponding to the three-dimensional scene, and store the texture data in a disk. After calculating a required physical texture, the terminal reads the required physical texture from the texture data in the disk, and loads the obtained physical texture to the texture cache.

Figure 5:
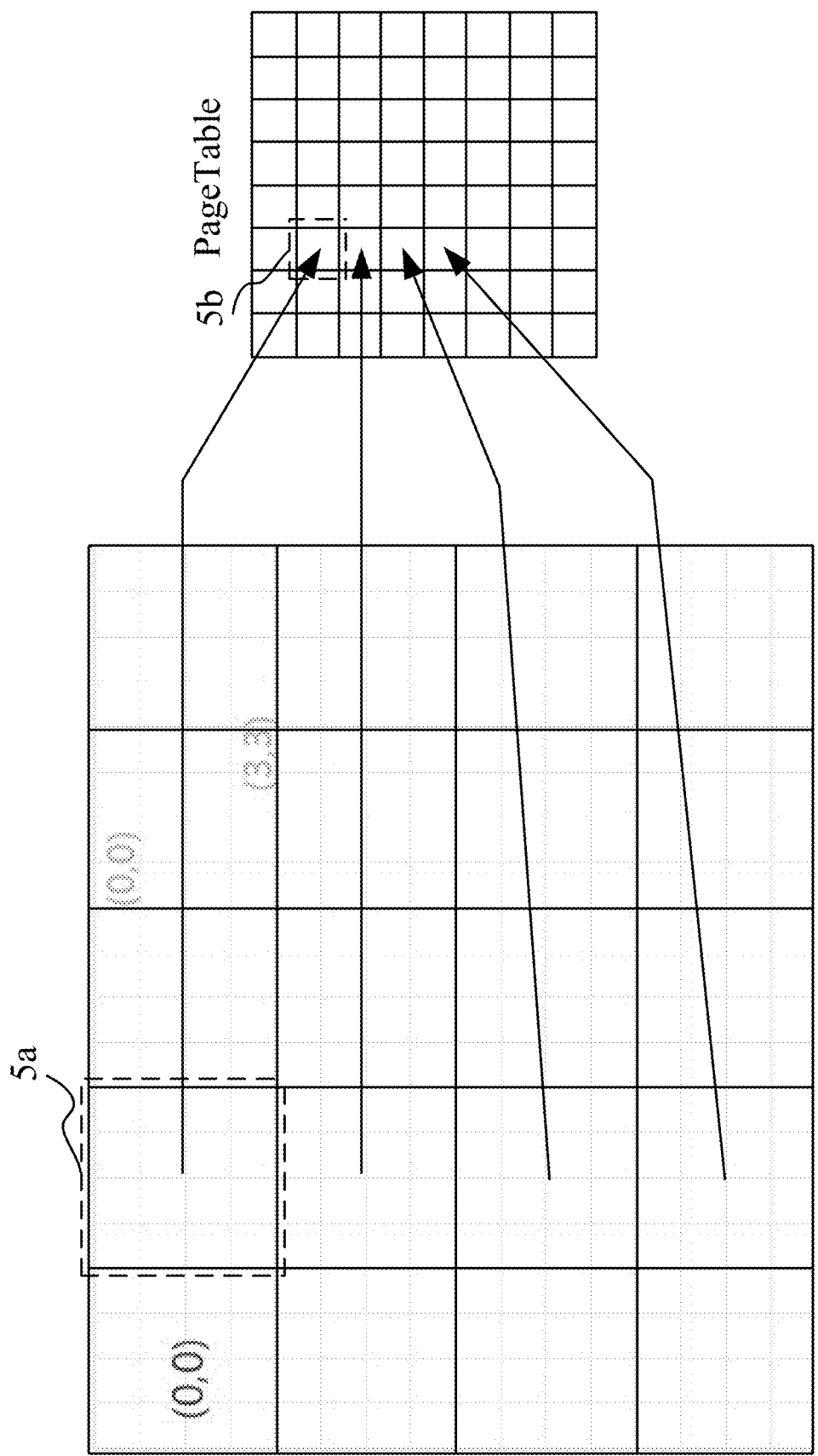
FIG. 5 is a schematic diagram of a virtual texture and a virtual texture page table according to an embodiment.

As shown in FIG. 5, in an embodiment, the left figure is a virtual texture divided into multiple virtual texture tiles, such as a virtual texture tile 5a. PageTable is a virtual texture page table that stores a mapping relationship between a virtual texture tile and a physical texture tile. That is, a physical texture corresponding to each virtual texture tile may be found from the virtual texture page table. For example, a physical texture tile 5b corresponding to the virtual texture tile 5a may be found from the virtual texture page table. Physical texture tiles corresponding to all the other virtual texture tiles may be found from the virtual texture page table.

In this embodiment, since the virtual texture page table stores the mapping relationship with the physical texture coordinate, the physical texture corresponding to the virtual texture tile may be determined accurately according to the corresponding physical texture coordinate found from the virtual texture page table according to the virtual texture coordinate.

In an embodiment, the operation of determining a virtual texture coordinate of the virtual texture tile corresponding to the vertex coordinate in a virtual texture coordinate system includes: determining a world coordinate of the virtual texture tile corresponding to the vertex coordinate; and determining the virtual texture coordinate of the virtual texture tile in the virtual texture coordinate system according to the world coordinate of the virtual texture tile.

It can be understood that a world coordinate refers to a coordinate in a world space coordinate system in the three-dimensional scene. A world coordinate of each vertex in the three-dimensional scene is fixed. Therefore, the coordinate of each vertex may be transformed taking the world coordinate as a reference.

When calculating the virtual texture coordinate of each virtual texture tile, the terminal may determine the virtual texture coordinate of each virtual texture tile based on a world coordinate corresponding to the vertex coordinate of each virtual texture tile. Specifically, the terminal first obtains the vertex coordinate of each virtual texture tile, and then calculates the world coordinate of the virtual texture tile corresponding to the vertex coordinate according to a world coordinate transformation matrix.

The terminal further calculates the virtual texture coordinate of each virtual texture tile in the virtual texture coordinate system according to the world coordinate corresponding to each virtual texture tile as well as a world origin in the virtual texture and a size covered by the virtual texture in the world space coordinate system.

For example, the terminal may subtract the world origin in the virtual texture from the world coordinate corresponding to each virtual texture tile to obtain an offset of the world coordinate corresponding to each virtual texture tile relative to the world origin. Then, the virtual texture coordinate of each virtual texture tile in the virtual texture coordinate system is determined according to a ratio of the obtained offset to the size covered by the virtual texture in the world space coordinate system. Therefore, the virtual texture coordinate corresponding to the virtual texture tile may be calculated accurately.

In an embodiment, the operation of obtaining a physical texture corresponding to each virtual texture tile according to a physical texture coordinate corresponding to the virtual texture coordinate in the virtual texture page table includes: determining the physical texture coordinate of the physical texture corresponding to each virtual texture tile in the virtual texture page table according to the virtual texture coordinate and a virtual texture size of the virtual texture; and obtaining the physical texture corresponding to each virtual texture tile according to the physical texture coordinate.

The virtual texture size of the virtual texture refers to a size of a single virtual texture tile in the virtual texture coordinate system.

When determining the physical texture corresponding to each virtual texture tile, the terminal may calculate the physical texture coordinate of the physical texture corresponding to each virtual texture tile according to the virtual texture coordinate of each virtual texture tile in the virtual texture coordinate system, a virtual texture size of each virtual texture tile in the virtual texture coordinate system, and a size of each virtual texture tile in the world space coordinate system.

Specifically, the terminal first determines an integral coordinate of the corresponding virtual texture page table according to the virtual texture coordinate of each virtual texture tile in the virtual texture coordinate system and the virtual texture size of each virtual texture tile in the virtual texture coordinate system. Then, the physical texture coordinate of the physical texture corresponding to each virtual texture tile in the virtual texture page table is calculated according to the integral coordinate of the virtual texture page table and the size of each virtual texture tile in the world space coordinate system. The terminal further reads the physical texture corresponding to each virtual texture tile from the texture data in the disk according to the physical texture coordinate, and loads the obtained physical texture to the texture cache.

In this embodiment, the physical texture corresponding to the virtual texture tile may be determined accurately according to the corresponding physical texture coordinate found from the virtual texture page table according to the virtual texture coordinate. The physical texture is loaded to the texture cache, so that the pixel shader may implement texture sampling from the texture cache accurately.

In an embodiment, the operation of determining, for each rendering child tile in the virtual texture tile corresponding to the vertex coordinate, a physical texture coordinate corresponding to each rendering child tile in the texture cache includes: performing scaling transformation processing on a vertex coordinate of each rendering child tile in the virtual texture tile according to a scaling transformation matrix to obtain a local virtual texture coordinate of each rendering child tile after scaling transformation; determining a starting physical texture coordinate corresponding to the physical texture according to a world coordinate corresponding to the virtual texture tile and a virtual texture coordinate corresponding to the virtual texture tile in a virtual texture page table; and determining the physical texture coordinate corresponding to each rendering child tile in the texture cache according to the local virtual texture coordinate of each rendering child tile and the starting physical texture coordinate corresponding to the physical texture.

It can be understood that coordinate transformation refers to mapping from one coordinate system to another. In a three-dimensional coordinate system, world space transformation processing is performed first on a vertex so as to transform the vertex of a model from a model space to a world space.

In three-dimensional graphics, geometric transformation includes translation transformation, scaling transformation, rotation transformation, and the like. Scaling transformation refers to scaling up or down the model, namely scaling up or down each vertex on the model, so as to increase or decrease a coordinate value of the vertex.

Vertex processing refers to all calculation on each vertex of each rendered element. A vertex transformation matrix is usually a floating-point matrix, which typically only performs translation, rotation, or scaling. A hierarchical structure of the scene may also be implemented by matrix transformation. The hierarchical structure of the scene may be used to draw connected person structures or models with relative positions. Vertex processing includes world transformation, texture coordinate calculation, texture transformation, visual transformation, vertex fogging, frustum culling, viewport mapping, etc. A vertex processing result may include a position, color, texture coordinate, and other result data of a screen space.

The scaling transformation matrix refers to a matrix corresponding to the virtual texture for scaling transformation processing. The starting physical texture coordinate of the physical texture may refer to a starting coordinate address of each physical texture, i.e., a coordinate of a starting origin of a single physical texture.

After determining the physical texture corresponding to each vertex coordinate through the vertex shader and loading the corresponding physical texture to the texture cache, the terminal further calculates the physical texture coordinate corresponding to each vertex coordinate according to the vertex coordinate.

Specifically, the terminal first performs, through the vertex shader, scaling transformation processing on a vertex coordinate of each rendering child tile in the virtual texture tile according to a preset scaling transformation matrix, so as to effectively obtain a local virtual texture coordinate of each rendering child tile after scaling transformation. For example, the terminal may directly multiply the vertex coordinate of each rendering child tile and the scaling transformation matrix to obtain the local virtual texture coordinate of each rendering child tile after scaling transformation.

The terminal further determines a starting physical texture coordinate corresponding to the physical texture according to a world coordinate corresponding to the virtual texture tile and a virtual texture coordinate corresponding to the virtual texture tile in a virtual texture page table. Specifically, the terminal may first determine an integral coordinate of the corresponding virtual texture page table according to the virtual texture coordinate of each virtual texture tile in the virtual texture coordinate system and the virtual texture size of each virtual texture tile in the virtual texture coordinate system. Then, the starting physical texture coordinate of the physical texture corresponding to each virtual texture tile in the virtual texture page table is calculated according to the integral coordinate of the virtual texture page table and the size of each virtual texture tile in the world space coordinate system.

The terminal further calculates, through the vertex shader, the physical texture coordinate corresponding to each rendering child tile in the texture cache according to the starting physical texture coordinate corresponding to the physical texture and a difference between the local virtual texture coordinate of each rendering child tile and the starting physical texture coordinate. Therefore, the physical texture coordinate corresponding to each rendering child tile may be calculated accurately.

In an embodiment, the operation of determining the physical texture coordinate corresponding to each rendering child tile in the texture cache according to the local virtual texture coordinate of each rendering child tile and the starting physical texture coordinate corresponding to the physical texture includes: aligning each virtual texture tile with a matched physical texture according to a starting virtual texture coordinate of each virtual texture tile and a starting physical texture coordinate corresponding to each physical texture; determining an offset of each rendering child tile in the virtual texture tile according to the starting virtual texture coordinate of the virtual texture tile and the local virtual texture coordinate of each rendering child tile; and determining the physical texture coordinate corresponding to each rendering child tile in the texture cache according to the starting physical texture coordinate corresponding to the physical texture and the offset.

It can be understood that the offset refers to a distance between an actual address of a storage unit and a segment address of a segment where the storage unit is located, also referred to as an in-segment offset or an effective address. The offset of each rendering child tile in the virtual texture tile represents a distance between the local virtual texture coordinate of each rendering child tile and a starting virtual texture coordinate of the virtual texture tile.

The rendering child tile may be a minimum drawing unit during rendering, specifically a pixel grid or a pixel grid corresponding to a pixel, for example.

Each virtual texture tile includes a corresponding starting virtual texture coordinate, i.e., a starting point coordinate of its own. It can be understood that the initial virtual texture has a corresponding starting point coordinate, and there is a corresponding position for the virtual texture tile in the virtual texture. That is, a position coordinate of each virtual texture tile in the virtual texture may be determined according to the vertex coordinate corresponding to the vertex of each virtual texture tile.

The terminal determines the physical texture corresponding to each virtual texture tile according to the vertex coordinate of the virtual texture tile, and loads the physical texture to the texture cache.

The terminal further performs scaling transformation processing on a vertex coordinate of each rendering child tile in the virtual texture tile according to a preset scaling transformation matrix to obtain a local virtual texture coordinate of each rendering child tile after scaling transformation. Then, the terminal determines a starting physical texture coordinate corresponding to the physical texture according to a world coordinate corresponding to the virtual texture tile and a virtual texture coordinate corresponding to the virtual texture tile in a virtual texture page table.

Figure 6:
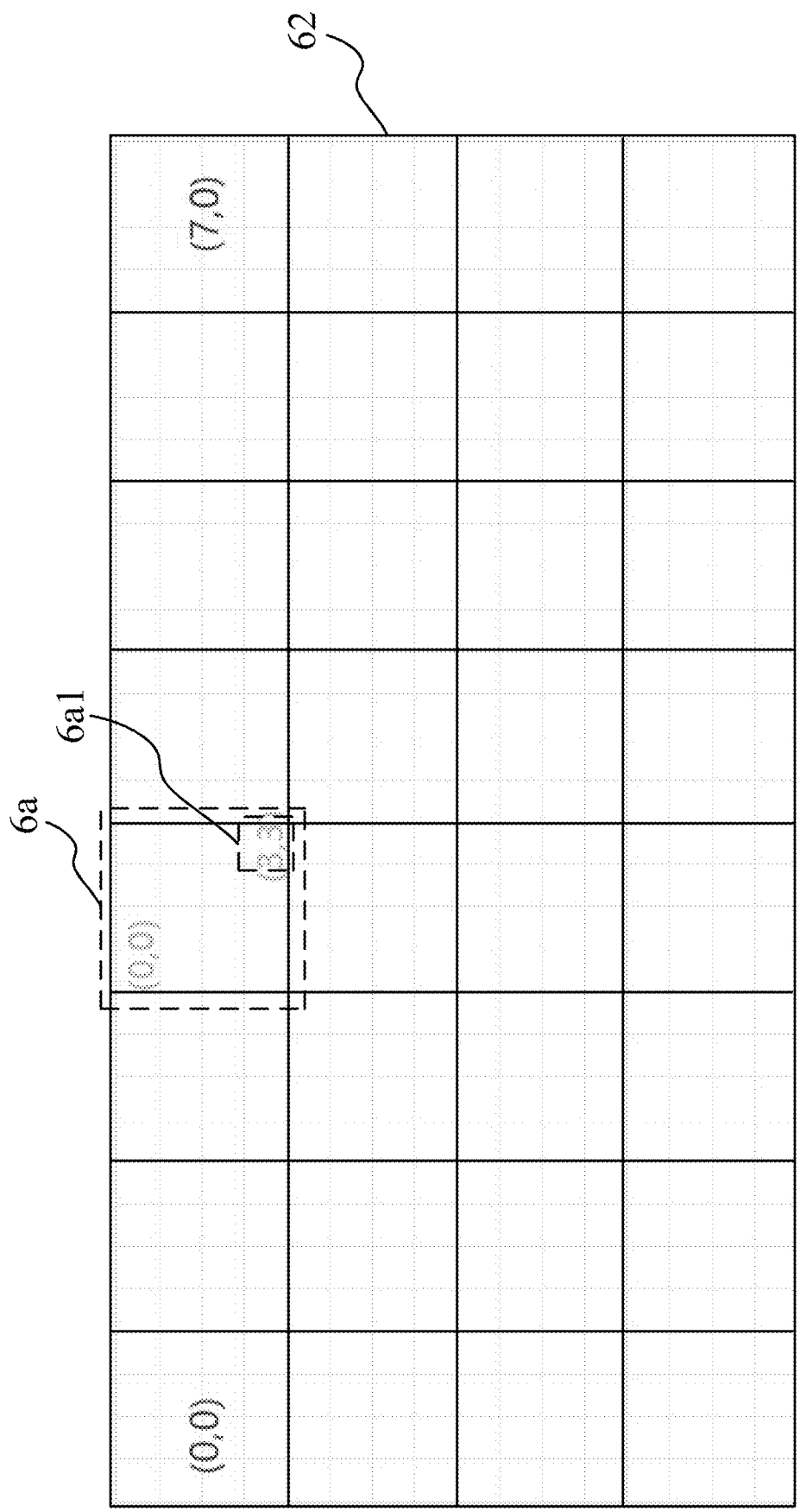
FIG. 6 is a schematic diagram of coordinates of rendering child tiles in virtual texture tiles according to an embodiment.

FIG. 6 shows a virtual texture in an embodiment. The virtual texture 62 includes multiple virtual texture tiles, each of which includes multiple rendering child tiles. A local virtual texture coordinate of each rendering child tile may be a vertex coordinate of a top-left vertex of each rendering child tile in the corresponding virtual texture tile. Taking a virtual texture tile 6a as an example, a vertex coordinate of a top-left vertex of a rendering child tile 6a1 in the virtual texture tile 6a is (3, 3), so that a local virtual texture coordinate of the rendering child tile 6a1 is (3, 3).

The terminal further aligns each virtual texture tile with a corresponding physical texture according to a starting virtual texture coordinate of each virtual texture tile and the starting physical texture coordinate of the corresponding physical texture. Since each virtual texture tile is consistent with the corresponding physical texture in mapping range, the terminal may determine the physical texture coordinate corresponding to each rendering child tile in the texture cache according to an offset of each rendering child tile in the virtual texture tile.

Specifically, the terminal determines an offset of each rendering child tile in the virtual texture tile according to the starting virtual texture coordinate of the virtual texture tile and the local virtual texture coordinate of each rendering child tile. For example, the terminal may determine th offset of each rendering child tile in the virtual texture tile according to a ratio of the local virtual texture coordinate of each rendering child tile after scaling transformation to a size of a single virtual texture tile in the virtual texture in the world space.

The terminal further determines the physical texture coordinate corresponding to each rendering child tile in the texture cache according to the starting physical texture coordinate corresponding to the physical texture and the offset. Specifically, the physical texture coordinate is calculated through the following formulas:

LPInC=LP*LS, where LP represents the local vertex coordinate of each rendering child tile in the virtual texture tile, LS represents the scaling transformation matrix, and LPInC represents the local virtual texture coordinate after scaling transformation;

BSWP=SP*WM, where SP represents the vertex coordinate of each virtual texture tile, WM represents a world transformation matrix, and BSWP represents the world coordinate corresponding to each virtual texture tile;

VTUV=(BSWP−VTOrg)/VTSize, where VTOrg represents the world origin coordinate of the virtual texture, i.e., the coordinate of the top-left vertex, VTSize represents the size covered by the virtual texture in the world coordinate system, and VTUV represents the virtual texture coordinate of each virtual texture tile;

VTPageCoord=floorToInt(VTUV/VTUVTileSize), where VTUVTileSize represents the size of a single virtual texture tile in a virtual texture space, and VTPageCoord represents the corresponding integral coordinate in PageTable;

PhysicalStartUV=PageTableTexture.Load(VTPageCoord), where PageTableTexture represents physical texture data in PageTable, and PhysicalStartUV represents a starting physical texture coordinate address corresponding to the physical texture; and PhysicalUV=PhysicalStartUV+(LPInC/VTWorldTileSize), where PhysicalUV represents the physical texture coordinate finally to be calculated corresponding to each rendering child tile in the texture cache.

The terminal may accurately calculate the corresponding physical texture coordinate corresponding to each rendering child tile in the physical texture in the texture cache by adding the starting physical texture coordinate of the physical texture to the offset of each rendering child tile in the virtual texture tile.

In an embodiment, the operation of determining, for each rendering child tile in the virtual texture tile corresponding to the vertex coordinate, a physical texture coordinate corresponding to each rendering child tile in the texture cache includes: determining, through a sampling node in the vertex shader for each rendering child tile in the virtual texture tile corresponding to the vertex coordinate, the physical texture coordinate corresponding to each rendering child tile in the texture cache. The operation of transmitting the physical texture coordinate to a pixel shader includes: transmitting, through the sampling node in the vertex shader, the physical texture coordinate to the pixel shader.

The sampling node refers to a processing node deployed in the vertex shader to calculate the physical texture coordinate, such that the vertex shader may directly calculate the physical texture coordinate after obtaining the vertex coordinate.

It can be understood that the vertex shader includes a vertex factory function. For example, a vertex shader in Unreal Engine includes a vertex factory function mainly responsible for transmitting vertex data of a specific grid type from a central processing unit (CPU) to a graphics processing unit (GPU). Then, rendering processing is performed in the pixel shader based on the transmitted vertex data. The sampling node may be one of vertex factory functions.

For example, a vertex factory function corresponding to the sampling node in Unreal Engine may specifically be FVertexFactoryInterpolantsVSToPS for transmitting vertex related data from the vertex shader to the pixel shader as vertex factory data.

After obtaining the vertex coordinate of each virtual texture tile, the terminal inputs the vertex coordinate to the vertex shader, and performs coordinate transformation processing on the vertex coordinate through the sampling node in the vertex shader to calculate the physical texture coordinate corresponding to each rendering child tile in the texture cache. Then, the terminal writes the calculated physical texture coordinate to a preset structure in the sampling node of the vertex shader. The terminal transmits the physical texture coordinate from the vertex shader to the pixel shader according to the preset structure. Therefore, the physical texture coordinate may be transmitted accurately and effectively to the pixel shader.

In an embodiment, the operation of transmitting, through the sampling node in the vertex shader, the physical texture coordinate to the pixel shader includes: performing, through the sampling node in the vertex shader, interpolation processing on a vertex attribute corresponding to the physical texture coordinate to obtain a physical texture coordinate of a pixel attribute; and transmitting the physical texture coordinate of the pixel attribute to the pixel shader.

Interpolation is a process or manner for deriving new data points over known and discrete data points. As an important manner for approximating discrete functions, interpolation may estimate approximate values of the functions at other points according to values of the functions at finite points.

It can be understood that input data usually includes only vertex information in a vertex processing stage. It is necessary in a rasterization process to perform attribute interpolation processing on a vertex attribute to obtain a pixel attribute. Specifically, scanning conversion processing is performed on part of vertex information of a triangle in the triangle obtain attribute information of each pixel in the triangle by interpolation, such that each pixel has the attribute information of position, color, texture coordinate, etc. Therefore, gaps between pixels during image transformation may be filled effectively.

The sampling node in the vertex shader may include a corresponding preset structure. It can be understood that a structure represents a data structure constructed by a predefined data type according to a preset data organization manner usually to encapsulate some attributes to form a new type to simplify operation and data reading. In this embodiment, the preset structure may be a data structure for supporting reading of the physical texture coordinate.

The preset structure may include a texture sampling coordinate attribute. The texture sampling coordinate attribute is used for indicating that it is necessary to perform interpolation processing on the physical texture coordinate in the preset structure.

When transmitting the physical texture coordinate from the vertex shader to the pixel shader, the terminal needs to perform attribute interpolation processing to transmit the physical texture coordinate to the pixel shader.

Specifically, the terminal calculates the physical texture coordinate corresponding to each rendering child tile in the texture cache through the vertex shader. In such case, a coordinate attribute of the physical texture coordinate is a vertex attribute. After writing the calculated physical texture coordinate to the preset structure in the sampling node of the vertex shader, the terminal performs interpolation processing on the vertex attribute corresponding to the physical texture coordinate according to the texture sampling coordinate attribute in the preset structure, so as to implement attribute interpolation of the physical texture coordinate of the vertex attribute to obtain a physical texture coordinate of a pixel attribute. Then, the terminal transmits the physical texture coordinate from the vertex shader to the pixel shader, such that the pixel shader may directly process the physical texture coordinate of the pixel attribute to further sample the texel matched with the physical texture coordinate from the physical texture in the texture cache according to the physical texture coordinate of the pixel attribute and render, based on the sampled texel, the image.

In this embodiment, the texture sampling coordinate attribute is deployed in the preset structure corresponding to the sampling node, so that interpolation processing may be performed effectively on the physical texture coordinate in the preset structure, and the physical texture coordinate may further be transmitted to the pixel shader.

Figure 7:
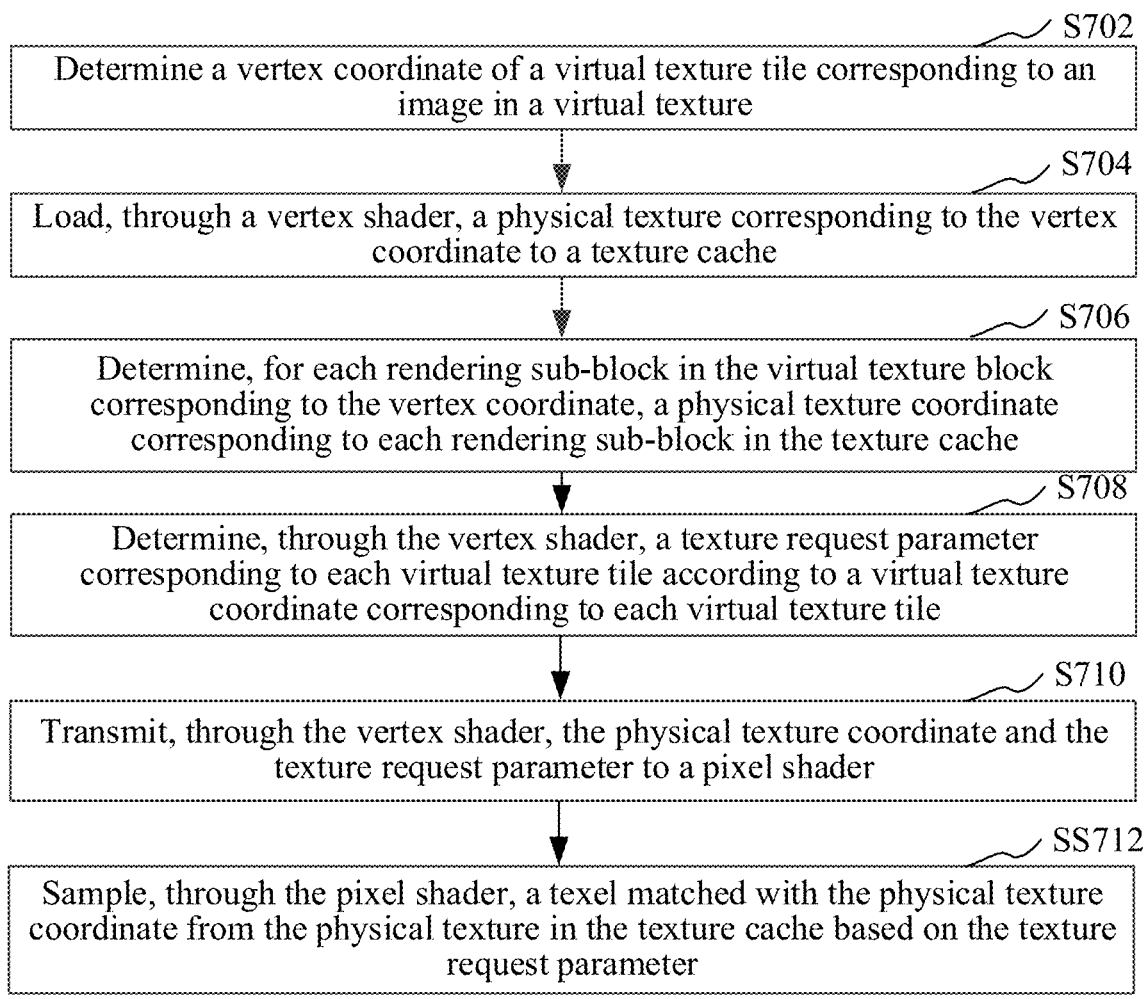
FIG. 7 is a schematic flowchart of an image rendering method according to another embodiment.

In an embodiment, as shown in FIG. 7, another image rendering method is provided. The method specifically includes the following steps:

S702: Determine a vertex coordinate of a virtual texture tile corresponding to an image in a virtual texture.

S704: Load, through a vertex shader, a physical texture corresponding to the vertex coordinate to a texture cache.

S706: Determine, for each rendering child tile in the virtual texture tile corresponding to the vertex coordinate, a physical texture coordinate corresponding to each rendering child tile in the texture cache.

S708: Determine, through the vertex shader, a texture request parameter corresponding to each virtual texture tile according to a virtual texture coordinate corresponding to each virtual texture tile.

S710: Transmit, through the vertex shader, the physical texture coordinate and the texture request parameter to a pixel shader.

S712: Sample, through the pixel shader, a texel matched with the physical texture coordinate from the physical texture in the texture cache based on the texture request parameter.

The texture request parameter is request parameter information representing virtual texture data required to be requested by the current image, which may be used for updating the required virtual texture data.

After obtaining a vertex coordinate of a virtual texture tile corresponding to an image in a virtual texture, a terminal performs, through a vertex shader, transformation processing on the vertex coordinate. The vertex shader determines, according to a vertex coordinate of each virtual texture tile, a physical texture corresponding to the virtual texture tile so as to load the physical texture to a texture cache.

The terminal further determines, through the vertex shader for each rendering child tile in the virtual texture tile corresponding to the vertex coordinate, a physical texture coordinate corresponding to each rendering child tile in the texture cache. Moreover, the terminal further determines, through the vertex shader, a texture request parameter corresponding to each virtual texture tile according to a virtual texture coordinate corresponding to each virtual texture tile.

The virtual texture coordinate corresponding to the virtual texture tile may specifically be a virtual texture coordinate of a vertex of the virtual texture tile in the virtual texture in a virtual texture coordinate system.

Specifically, the terminal may first determine an integral coordinate of a corresponding virtual texture page table according to the virtual texture coordinate of each virtual texture tile in the virtual texture coordinate system and a virtual texture size of each virtual texture tile in the virtual texture coordinate system. Then, the texture request parameter corresponding to each virtual texture tile is obtained according to the integral coordinate of the virtual texture page table.

After calculating, through the vertex shader, the required physical texture coordinate and texture request parameter, the terminal transmits the physical texture coordinate and the texture request parameter to a pixel shader. Specifically, the vertex shader of the terminal may write the physical texture coordinate and the texture request parameter to a preset structure. The preset structure includes a texture sampling coordinate attribute and a texture request parameter attribute. The texture sampling coordinate attribute is used for indicating that it is necessary to perform interpolation processing on the physical texture coordinate in the preset structure. The texture request parameter attribute is used for transmitting the texture request parameter to the pixel shader.

After obtaining the physical texture coordinate and texture request parameter input by the vertex shader, the pixel shader samples a texel matched with the physical texture coordinate from the physical texture in the texture cache according to the texture request parameter. When a level of the required virtual texture data changes, the corresponding virtual texture tile is updated according to the texture request parameter to further sample a required texel according to the calculated physical texture coordinate. Therefore, the image may be rendered accurately and effectively.

In an embodiment, the operation of determining a texture request parameter corresponding to each virtual texture tile according to a virtual texture coordinate corresponding to each virtual texture tile includes: correcting the virtual texture coordinate corresponding to each virtual texture tile according to a size of a virtual texture page in a virtual texture page table to obtain a corrected virtual texture coordinate; and generating the texture request parameter corresponding to each virtual texture tile according to the corrected virtual texture coordinate.

It can be understood that the virtual texture page table includes multiple virtual texture pages, each of which is of a corresponding size. The virtual texture page in the virtual texture page table corresponds to the virtual texture tile in the virtual texture. A texture request parameter corresponding to the virtual texture tile of a corresponding texture level may be determined according to the size of the virtual texture page.

For example, when the image is a continuous image frame, it is necessary to continuously update a texture corresponding to a required texture level according to a change in a view angle in a three-dimensional scene.

Specifically, the terminal may correct the virtual texture coordinate corresponding to each virtual texture tile according to the virtual texture coordinate corresponding to each virtual texture tile and a size of a virtual texture page in a current virtual texture page table to obtain a corrected virtual texture coordinate. For example, the terminal may modify the virtual texture coordinate according to an addressing mode of the virtual texture coordinate and the size of the virtual texture page in the virtual texture page table. Then, the terminal updates the texture request parameter corresponding to each virtual texture tile according to the corrected virtual texture coordinate. Therefore, the texture request parameter corresponding to the virtual texture tile of the required texture level may be generated accurately.

In an embodiment, the operation of generating the texture request parameter corresponding to each virtual texture tile according to the corrected virtual texture coordinate includes: determining a texture level corresponding to the virtual texture page according to the corrected virtual texture coordinate; determining a pixel coordinate corresponding to each virtual texture tile in a virtual texture page according to the corrected virtual texture coordinate and the texture level; and generating the texture request parameter corresponding to each virtual texture tile according to the pixel coordinate.

It can be understood that the virtual texture may include texture data respectively corresponding to multiple texture levels, such as texture data respectively corresponding to multiple texture levels generated based on Mipmap. The texture data corresponding to each texture level is different in accuracy.

For example, Mip level 0 is a level of top accuracy. Mip level 1 is a half of those of level 0 in image width and height. Mip level n is a half of a previous level in image width and height. The correct texture level is determined to determine the correct texture request parameter, so that the required texel may be sampled accurately.

Specifically, after obtaining the corrected virtual texture coordinate according to the virtual texture coordinate corresponding to each virtual texture tile and the size of the virtual texture page in the current virtual texture page table, the terminal determines a texture level corresponding to the required virtual texture page according to the corrected virtual texture coordinate. Specifically, the terminal may determine the texture level corresponding to the virtual texture page according to the corrected virtual texture coordinate.

Then, the terminal determines a pixel coordinate corresponding to each virtual texture tile in a virtual texture page according to the corrected virtual texture coordinate and the texture level, and generates the texture request parameter corresponding to each virtual texture tile according to the texture level and the pixel coordinate. Therefore, the texture request parameter corresponding to the virtual texture tile of the required texture level may be generated accurately.

For example, the terminal may modify the virtual texture coordinate according to an addressing mode of the virtual texture coordinate, and then calculate the pixel coordinate corresponding to the virtual texture coordinate in the virtual texture page according to the number and sizes of virtual texture pages in the current virtual texture and the calculated virtual texture coordinate.

Figure 8:
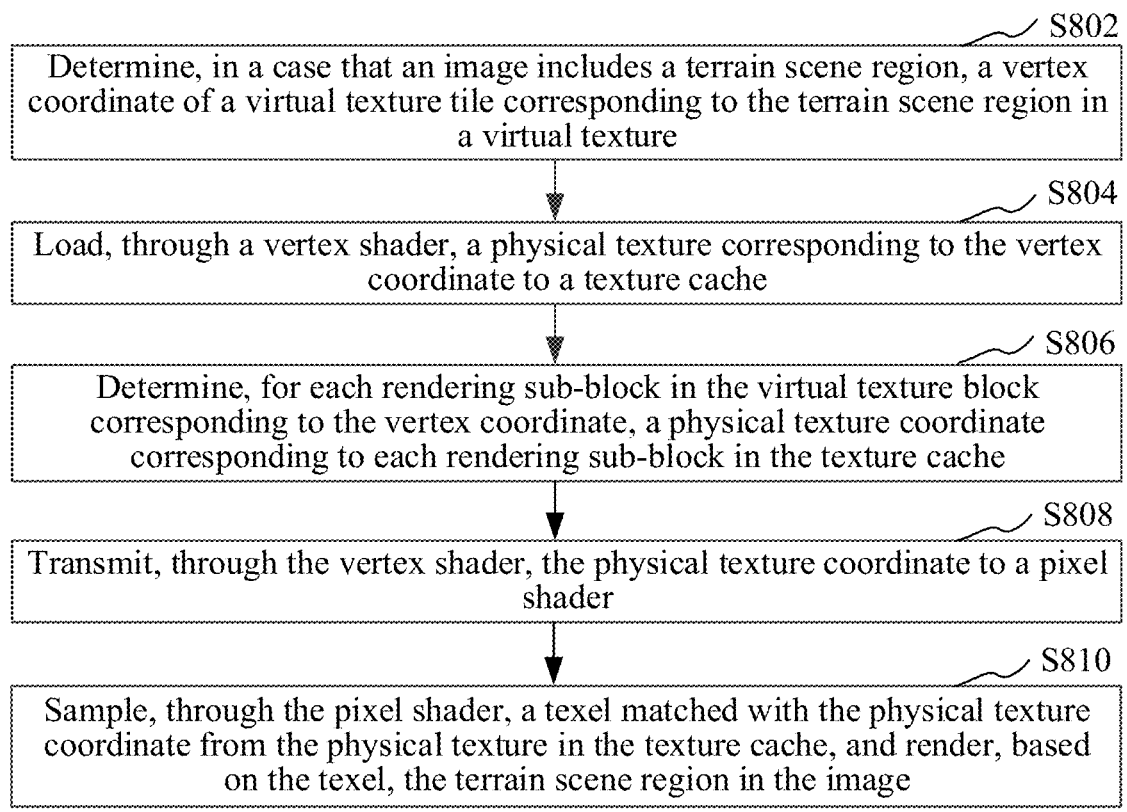
FIG. 8 is a schematic flowchart of an image rendering method according to still another embodiment.

In an embodiment, as shown in FIG. 8, another image rendering method is provided. The method specifically includes the following steps:

S802: Determine, when an image includes a terrain scene region, a vertex coordinate of a virtual texture tile corresponding to the terrain scene region in a virtual texture.

S804: Load, through a vertex shader, a physical texture corresponding to the vertex coordinate to a texture cache.

S806: Determine, for each rendering child tile in the virtual texture tile corresponding to the vertex coordinate, a physical texture coordinate corresponding to each rendering child tile in the texture cache.

S808: Transmit, through the vertex shader, the physical texture coordinate to a pixel shader.

S810: Sample, through the pixel shader, a texel matched with the physical texture coordinate from the physical texture in the texture cache, and render, based on the texel, the terrain scene region in the image.

It can be understood that the image includes image regions of various types of scene objects in a three-dimensional scene. For example, the scene objects may include at least one of a three-dimensional terrain, a house, a tree, and a person.

The terrain scene region in the image may be a region corresponding to a three-dimensional terrain in the three-dimensional scene to be displayed. It can be understood that the image may include the terrain scene region only, or the terrain scene region and a region corresponding to another scene object. No limits are made in this application.

For a three-dimensional terrain with a relatively large area, it is usually necessary to combine multiple terrain texture images to obtain a complete three-dimensional terrain. The vertex coordinate of the virtual texture tile corresponding to the terrain scene region may be a vertex coordinate corresponding to each grid vertex, which is generated in advance according to the grid vertex in a terrain grid.

When an image includes a terrain scene region, a terminal determines a vertex coordinate of a virtual texture tile corresponding to the terrain scene region in a virtual texture, and inputs the vertex coordinate to a vertex shader. Then, through the vertex shader, a physical texture corresponding to the vertex coordinate is determined, and the physical texture is loaded to a texture cache.

The terminal determines, through the vertex shader for each rendering child tile in the virtual texture tile corresponding to the vertex coordinate, a physical texture coordinate corresponding to each rendering child tile in the texture cache. Then, the physical texture coordinate is transmitted to a pixel shader through the vertex shader.

The terminal further samples, through the pixel shader, a texel matched with the physical texture coordinate from the physical texture in the texture cache, and renders, based on the texel, the terrain scene region in the image.

In one embodiment, when the image further includes a region corresponding to another scene object, the terminal obtains and inputs, to the vertex shader, a vertex coordinate of a virtual texture tile corresponding to the region of the other scene object. Then, vertex coordinate transformation processing is performed on the vertex coordinate through the vertex shader to obtain vertex data after vertex transformation. Next, the vertex data after vertex transformation is transmitted to the pixel shader through the vertex shader, such that the pixel shader determines a physical texture of the other scene object corresponding to the vertex data according to the vertex data after transformation, and loads the physical texture to the texture cache. Later on, the pixel shader calculates a physical texture coordinate corresponding to the region of the other scene object in the physical texture of the other scene object according to the vertex data after transformation.

The terminal further samples, through the pixel shader, a texel matched with the region of the other scene object from the physical texture in the texture cache according to the physical texture coordinate. The pixel shader further renders the terrain scene region and region of the other scene object in the image base on the sampled texel matched with the terrain scene region and texel matched with the region of the other scene object.

In one embodiment, the image rendering method is applicable to a three-dimensional scene of a fixed top view angle. Specifically, a virtual observation point in the three-dimensional scene is arbitrarily variable, or a field of view may be enlarged or reduced arbitrarily. Therefore, sampling of too small textures is avoided, and the image rendering accuracy may be ensured effectively.

In this embodiment, the terrain scene region is separated, and for particular properties of the terrain scene object, the physical texture coordinate of the terrain scene region is calculated in the vertex shader. As such, the calculation of the pixel shader may be reduced effectively without affecting the rendering processing of the region of the other scene object. Therefore, the resource consumption during image rendering is reduced effectively, and the rendering efficiency may further be improved effectively.

Figure 9:
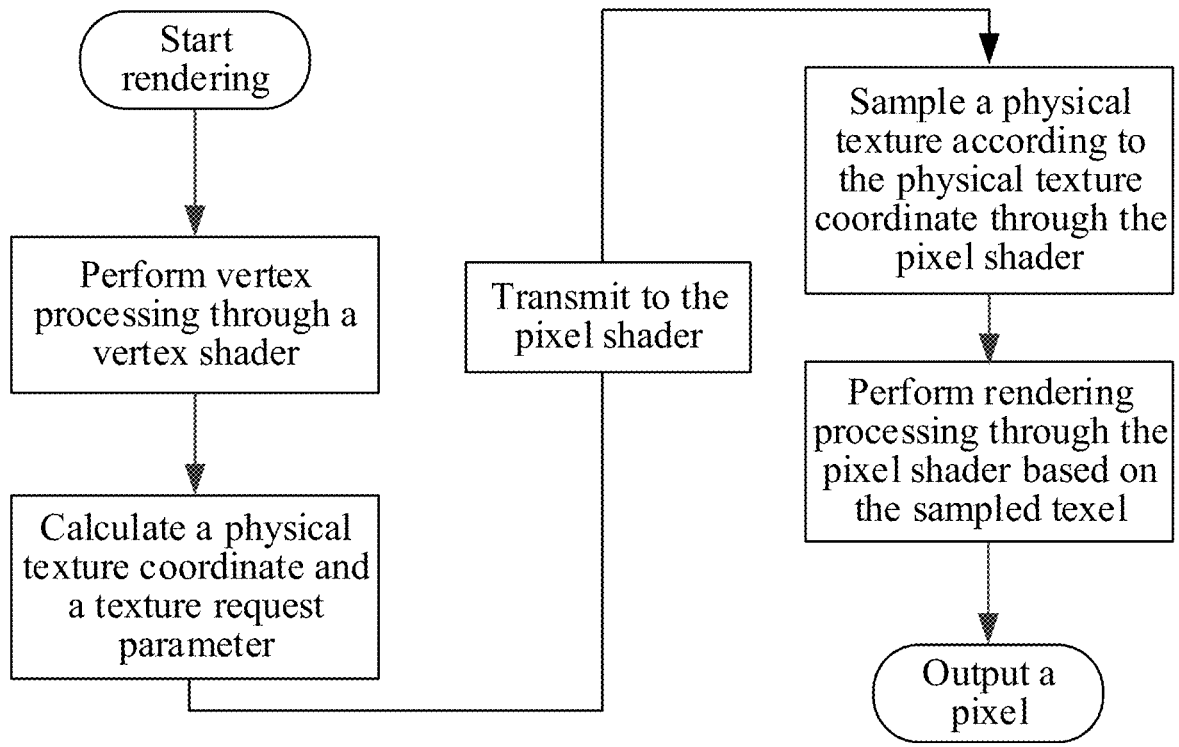
FIG. 9 is a flowchart of drawing a virtual terrain texture according to an embodiment.

In a specific embodiment, FIG. 9 is a flowchart of drawing a virtual terrain texture. When starting rendering processing, the terminal obtains vertex data corresponding to an image, and inputs the vertex data to a vertex shader to perform terrain vertex processing through the vertex shader. Specifically, the terminal performs, through the vertex shader according to a vertex coordinate of a virtual texture tile corresponding to the image in a virtual texture in the vertex data, coordinate transformation processing on the vertex coordinate based on a world coordinate of each vertex, and further determines a physical texture corresponding to each virtual texture tile according to a transformed vertex coordinate to load the physical texture to a texture cache.

The terminal further calculates physical UV (physical texture coordinate) and request (texture request parameter) through the vertex shader, and then transmits the physical texture coordinate after interpolation processing and the texture request parameter to a pixel shader. The terminal samples, through the pixel shader, a texel in the physical texture from the texture cache according to the physical texture coordinate after interpolation processing, and further performs another pixel shading operation based on the sampled texel to render the image. Finally, a pixel of a rendered image is output to a display screen of the terminal for displaying.

In this embodiment, for the virtual terrain texture, the required physical texture coordinate is calculated and transmitted to the pixel shader through the vertex shader, such that the pixel shader needs not to calculate the physical texture coordinate. Therefore, the physical texture coordinate for texture sampling may be calculated accurately, meanwhile, the calculation of the pixel shader is reduced effectively, and efficient and accurate image rendering of a terrain scene may further be implemented.

This application also provides an application scene, which is an open-world three-dimensional game scene the foregoing image rendering method is applied to. Specifically, the open-world three-dimensional game scene includes an open-world terrain. The open-world terrain is an open-world task space, which usually includes a large-area map corresponding to the open-world terrain, including a pre-drawn terrain texture corresponding to the open-world terrain. Since the open-world terrain has a relatively large scope, and it is necessary to load a large number of texture tiles obtained by dividing the terrain texture, the open-world terrain has a relatively high requirement for the accuracy of the terrain texture.

A three-dimensional game application corresponding to the three-dimensional game scene is deployed in a terminal. The terminal may obtain, through the three-dimensional game application, a game texture resource generated in advance by a game editor. When running the three-dimensional game application, the terminal obtains a virtual texture corresponding to an image and corresponding vertex data, determines a vertex coordinate of a virtual texture tile corresponding to the image in the virtual texture, and inputs the vertex coordinate to a vertex shader. The terminal further determines, through the vertex shader, a physical texture corresponding to the virtual texture tile according to the vertex coordinate so as to load the physical texture to a texture cache.

The terminal further determines, for each rendering child tile in the virtual texture tile corresponding to the vertex coordinate, a physical texture coordinate corresponding to each rendering child tile in the texture cache. Then, the terminal transmits the calculated physical texture coordinate to a pixel shader through the vertex shader. The terminal further samples, through the pixel shader, a texel matched with the physical texture coordinate from the physical texture in the texture cache, and renders, based on the texel, the image.

In one embodiment, the image may include a terrain scene region and a region corresponding to another scene object. The game texture resource includes terrain texture data corresponding to the open-world terrain in the three-dimensional game scene and texture data corresponding to the other scene object in the three-dimensional game scene.

Specifically, for the terrain scene region in the image, the terminal obtains virtual terrain texture data and terrain location data corresponding to the terrain scene region, determines a terrain vertex coordinate of a virtual terrain texture tile corresponding to the terrain scene region in the virtual terrain texture, and inputs the terrain vertex coordinate to the vertex shader. A physical terrain texture corresponding to the virtual terrain texture tile is determined through the vertex shader, and the physical terrain texture is loaded to the texture cache. Then, a physical texture coordinate corresponding to the terrain scene region is calculated and transmitted to the pixel shader through the vertex shader.

For the region of the other scene object in the image, the terminal performs vertex coordinate transformation processing on a vertex coordinate through the vertex shader. Then, vertex shader transmits vertex data after vertex transformation to the pixel shader, such that the pixel shader calculates a physical texture coordinate corresponding to the region of the other scene object in a physical texture of the other scene object according to the vertex data after transformation.

The terminal further samples, through the pixel shader, a matched texel from the corresponding physical texture in the texture cache according to the physical texture coordinates corresponding to the terrain scene region and the other scene object, and renders, based on the texel, the image. The terrain scene region is separated, and for particular properties of the terrain scene object, the physical texture coordinate of the terrain scene region is calculated in the vertex shader. Therefore, the calculation of the pixel shader may be reduced effectively, and the image rendering efficiency is further improved effectively.

In one embodiment, the three-dimensional game scene is a three-dimensional game scene of a fixed view angle. For example, the fixed view angle may be a fixed top view angle. Since sampling of too small textures is avoided at the fixed view angle, with adoption of the image rendering method, the resource consumption during image rendering may be reduced effectively, and there are present no obvious noises even if Mipmap is not used. Therefore, even a mobile terminal with relatively low performance may efficiently render a high-accuracy open-world terrain and multilayer mixed terrain materials, effectively improving the image rendering efficiency.

This application also provides an application scene, which is a three-dimensional environment demonstration scene, such as a tourist environment demonstration environment and a building demonstration scene. The foregoing image rendering method is applied to the three-dimensional environment demonstration scene. For three-dimensional environment demonstration scenes in various environments, texture data corresponding to various three-dimensional scenes may be obtained in advance.

When displaying the three-dimensional environment demonstration scene, a terminal obtains a virtual texture corresponding to an image and corresponding vertex data, determines a vertex coordinate of a virtual texture tile corresponding to the image in the virtual texture, and inputs the vertex coordinate to a vertex shader. The terminal further determines, through the vertex shader, a physical texture corresponding to the virtual texture tile according to the vertex coordinate so as to load the physical texture to a texture cache.

The terminal further determines, for each rendering child tile in the virtual texture tile corresponding to the vertex coordinate, a physical texture coordinate corresponding to each rendering child tile in the texture cache. Then, the terminal transmits the calculated physical texture coordinate to a pixel shader through the vertex shader. The terminal further samples, through the pixel shader, a texel matched with the physical texture coordinate from the physical texture in the texture cache, and renders, based on the texel, the image. The required physical texture coordinate is calculated and transmitted to the pixel shader through the vertex shader, such that the pixel shader needs not to calculate the physical texture coordinate. Therefore, the calculation of the pixel shader may be reduced effectively, and the image rendering efficiency is further improved effectively.

Although the steps in the flowchart are sequentially shown according to indication of an arrow the steps are not necessarily sequentially performed according to a sequence indicated by the arrow. Unless otherwise clearly specified in this specification, the steps are performed without any strict sequence limit, and may be performed in other sequences. In addition, at least some steps in the flowcharts may include a plurality of steps or a plurality of stages. The steps or stages are not necessarily performed at the same moment, but may be performed at different moments. The steps or the stages are not necessarily performed in sequence, but may be performed in turn or alternately with another step or at least some of steps or stages of the another step.

Figure 10:
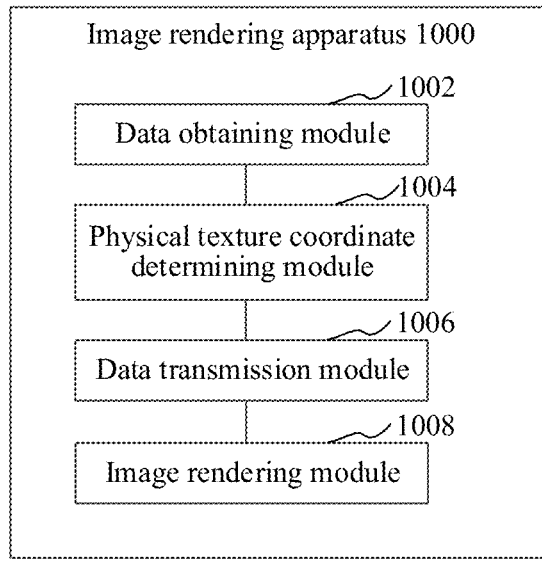
FIG. 10 is a structural block diagram of an image rendering apparatus according to an embodiment.

In an embodiment, as shown in FIG. 10, an image rendering apparatus 1000 is provided, which may be implemented as a part of a computer device by a software module, or a hardware module, or a combination thereof. The apparatus specifically includes a data obtaining module 1002, a physical texture coordinate determining module 1004, a data transmission module 1006, and an image rendering module 1008.

The data obtaining module 1002 is configured to determine a vertex coordinate of a virtual texture tile corresponding to an image in a virtual texture, and load, through a vertex shader, a physical texture corresponding to the vertex coordinate to a texture cache.

The physical texture coordinate determining module 1004 is configured to determine, for each rendering child tile in the virtual texture tile corresponding to the vertex coordinate, a physical texture coordinate corresponding to each rendering child tile in the texture cache.

The data transmission module 1006 is configured to transmit the physical texture coordinate to a pixel shader.

The image rendering module 1008 is configured to sample, through the pixel shader, a texel matched with the physical texture coordinate from the physical texture in the texture cache, and render, based on the texel, the image.

In an embodiment, the data obtaining module 1002 is further configured to: determine, through the vertex shader, a virtual texture coordinate of the virtual texture tile corresponding to the vertex coordinate in a virtual texture coordinate system; obtain a virtual texture page table, the virtual texture page table storing a mapping relationship between a virtual texture coordinate and a physical texture coordinate, and the physical texture coordinate being a coordinate of a physical texture in a physical texture coordinate system; obtain a physical texture corresponding to each virtual texture tile according to a physical texture coordinate corresponding to the virtual texture coordinate in the virtual texture page table; and load the obtained physical texture to the texture cache.

In an embodiment, the data obtaining module 1002 is further configured to determine a world coordinate of the virtual texture tile corresponding to the vertex coordinate, and determine the virtual texture coordinate of the virtual texture tile in the virtual texture coordinate system according to the world coordinate of the virtual texture tile.

In an embodiment, the data obtaining module 1002 is further configured to determine the physical texture coordinate of the physical texture corresponding to each virtual texture tile in the virtual texture page table according to the virtual texture coordinate and a virtual texture size of the virtual texture, and obtain the physical texture corresponding to each virtual texture tile according to the physical texture coordinate.

In an embodiment, the physical texture coordinate determining module 1004 is further configured to perform scaling transformation processing on a vertex coordinate of each rendering child tile in the virtual texture tile according to a scaling transformation matrix to obtain a local virtual texture coordinate of each rendering child tile after scaling transformation, determine a starting physical texture coordinate corresponding to the physical texture according to a world coordinate corresponding to the virtual texture tile and a virtual texture coordinate corresponding to the virtual texture tile in a virtual texture page table, and determine the physical texture coordinate corresponding to each rendering child tile in the texture cache according to the local virtual texture coordinate of each rendering child tile and the starting physical texture coordinate corresponding to the physical texture.

In an embodiment, the physical texture coordinate determining module 1004 is further configured to align each virtual texture tile with a matched physical texture according to a starting virtual texture coordinate of each virtual texture tile and a starting physical texture coordinate corresponding to each physical texture, determine an offset of each rendering child tile in the virtual texture tile according to the starting virtual texture coordinate of the virtual texture tile and the local virtual texture coordinate of each rendering child tile, and determine the physical texture coordinate corresponding to each rendering child tile in the texture cache according to the starting physical texture coordinate corresponding to the physical texture and the offset.

In an embodiment, the physical texture coordinate determining module 1004 is further configured to determine, through a sampling node in the vertex shader for each rendering child tile in the virtual texture tile corresponding to the vertex coordinate, the physical texture coordinate corresponding to each rendering child tile in the texture cache. The data transmission module 1006 is further configured to transmit, through the sampling node in the vertex shader, the physical texture coordinate to the pixel shader.

In an embodiment, the data transmission module 1006 is further configured to perform, through the sampling node in the vertex shader, interpolation processing on a vertex attribute corresponding to the physical texture coordinate to obtain a physical texture coordinate of a pixel attribute, and transmit the physical texture coordinate of the pixel attribute to the pixel shader.

In an embodiment, the image rendering apparatus further includes a parameter determining module, configured to determine, through the vertex shader, a texture request parameter corresponding to each virtual texture tile according to a virtual texture coordinate corresponding to each virtual texture tile, and transmit, through the vertex shader, the physical texture coordinate and the texture request parameter to the pixel shader. The image rendering module 1008 is further configured to sample, through the pixel shader, the texel matched with the physical texture coordinate from the physical texture in the texture cache based on the texture request parameter.

In an embodiment, the parameter determining module is further configured to correct the virtual texture coordinate corresponding to each virtual texture tile according to a size of a virtual texture page in a virtual texture page table to obtain a corrected virtual texture coordinate, and generate the texture request parameter corresponding to each virtual texture tile according to the corrected virtual texture coordinate.

In an embodiment, the parameter determining module is further configured to determine a texture level corresponding to the virtual texture page according to the corrected virtual texture coordinate, determine a pixel coordinate corresponding to each virtual texture tile in a virtual texture page according to the corrected virtual texture coordinate and the texture level, and generate the texture request parameter corresponding to each virtual texture tile according to the pixel coordinate.

In an embodiment, the data obtaining module 1002 is further configured to determine, when the image includes a terrain scene region, a vertex coordinate of a virtual texture tile corresponding to the terrain scene region in the virtual texture. The image rendering module 1008 is further configured to sample, through the pixel shader, a texel matched with the physical texture coordinate from the physical texture in the texture cache, and render, based on the texel, the terrain scene region in the image.

For a specific limitation on the image rendering apparatus, reference is made to the limitation on the image rendering method above, and details are not described herein again. Each module in the foregoing image rendering apparatus may be implemented in whole or in part by software, hardware, and combinations thereof. The foregoing modules may be built in or independent of one or more processors of a computer device in a hardware form, or may be stored in a memory of the computer device in a software form, so that one or more processors invoke and perform an operation corresponding to each of the foregoing modules.

In an embodiment, a computer device is provided. The computer device may be a terminal, and an internal structure diagram thereof may be shown in FIG. 11. The computer device includes one or more processors, a memory, a communication interface, a display screen, and an input apparatus that are connected by using a system bus. The one or more processors of the computer device are configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instruction in the non-volatile storage medium. The communication interface of the computer device is configured to communicate with an external terminal in a wired or a wireless manner, and the wireless manner can be implemented by using WIFI, an operator network, NFC, or other technologies. The computer-readable instruction is executed by one or more processors to implement the image rendering method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 11:
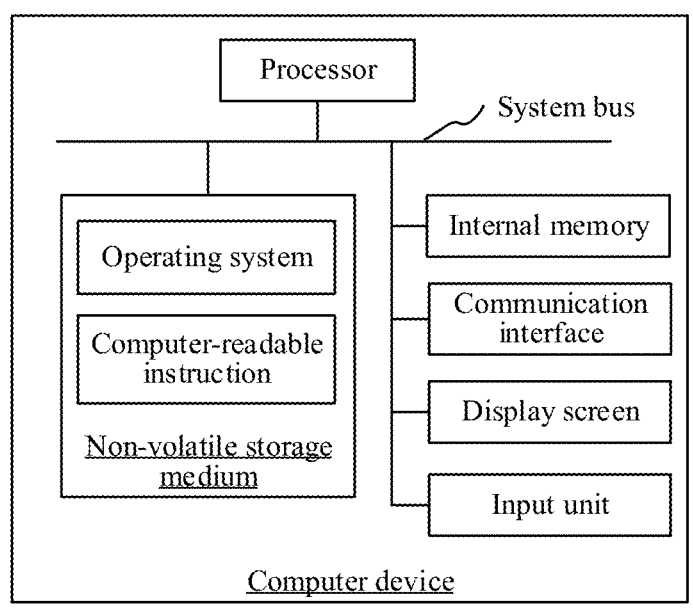
FIG. 11 is a diagram of an internal structure of a computer device according to an embodiment.

A person skilled in the art may understand that, the structure shown in FIG. 11 is only a block diagram of a part of a structure related to a solution of this application and does not limit the computer device to which the solution of this application is applied. Specifically, the computer device may include more or fewer components than those in the drawings, or some components are combined, or a different component deployment is used.

In an embodiment, a computer device is further provided, including a memory and one or more processors, the memory storing computer-readable instructions, the one or more processors, when executing the computer-readable instructions, implementing the steps in the foregoing method embodiments.

In an embodiment, one or more computer-readable storage media are provided, storing computer-readable instructions, the computer-readable instructions, when executed by one or more processors, implementing the steps in the foregoing method embodiments.

In an embodiment, a computer program product is provided. The computer program product includes computer-readable instructions, the computer-readable instructions being stored in a computer-readable storage medium. The one or more processors of the computer device read the computer-readable instructions from the computer-readable storage medium, and the one or more processors execute the computer-readable instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of this application specifically and in detail, but cannot be construed as a limitation to the patent scope of this application. It should be noted that a person of ordinary skill in the art may make various changes and improvements without departing from the ideas of this application, which shall all fall within the protection scope of this application. Therefore, the protection scope of this patent application is subject to the protection scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An image rendering method performed by a computer device, the method comprising:
   determining a vertex coordinate of a virtual texture tile corresponding to an image in a virtual texture;
   loading, through a vertex shader, a physical texture corresponding to the vertex coordinate to a texture cache;
   performing, through a sampling node in the vertex shader, scaling transformation processing on a vertex coordinate of each rendering child tile in the virtual texture tile according to a scaling transformation matrix to obtain a local virtual texture coordinate of each rendering child tile;
   determining a starting physical texture coordinate corresponding to the physical texture according to a world coordinate corresponding to the virtual texture tile;
   determining the physical texture coordinate corresponding to each rendering child tile in the texture cache according to the local virtual texture coordinate of each rendering child tile and the starting physical texture coordinate corresponding to the physical texture;
   transmitting the physical texture coordinate to a pixel shader; and
   sampling, through the pixel shader, a texel matched with the physical texture coordinate from the physical texture in the texture cache, and rendering, based on the texel, the image.

2. The method according to claim 1, wherein the loading, through the vertex shader, the physical texture corresponding to the vertex coordinate to the texture cache comprises:
   determining, through the vertex shader, the local virtual texture coordinate of the virtual texture tile corresponding to the vertex coordinate in a virtual texture coordinate system;
   obtaining a virtual texture page table, the virtual texture page table storing a mapping relationship between the local virtual texture coordinate and the physical texture coordinate, and the physical texture coordinate being a coordinate of the physical texture in a physical texture coordinate system;
   obtaining the physical texture corresponding to each virtual texture tile according to the physical texture coordinate corresponding to the local virtual texture coordinate in the virtual texture page table; and
   loading the obtained physical texture to the texture cache.

3. The method according to claim 2, wherein the obtaining the physical texture corresponding to each virtual texture tile according to the physical texture coordinate corresponding to the local virtual texture coordinate in the virtual texture page table comprises:
   determining the physical texture coordinate of the physical texture corresponding to each virtual texture tile in the virtual texture page table according to the local virtual texture coordinate and a virtual texture size of the virtual texture; and
   obtaining the physical texture corresponding to each virtual texture tile according to the physical texture coordinate.

4. The method according to claim 1, wherein
   the transmitting the physical texture coordinate to the pixel shader comprises:
   transmitting, through the sampling node in the vertex shader, the physical texture coordinate to the pixel shader.

5. The method according to claim 1, further comprising:
   determining, through the vertex shader, a texture request parameter corresponding to each virtual texture tile according to the local virtual texture coordinate corresponding to each virtual texture tile; and
   transmitting, through the vertex shader, the physical texture coordinate and the texture request parameter to the pixel shader, wherein
   the sampling, through the pixel shader, the texel matched with the physical texture coordinate from the physical texture in the texture cache comprises:
   sampling, through the pixel shader, the texel matched with the physical texture coordinate from the physical texture in the texture cache based on the texture request parameter.

6. The method according to claim 1, wherein the determining the vertex coordinate of the virtual texture tile corresponding to the image in the virtual texture comprises:

determining, when the image comprises a terrain scene region, the vertex coordinate of the virtual texture tile corresponding to the terrain scene region in the virtual texture; and the sampling, through the pixel shader, the texel matched with the physical texture coordinate from the physical texture in the texture cache and rendering, based on the texel, the image comprises:

sampling, through the pixel shader, the texel matched with the physical texture coordinate from the physical texture in the texture cache, and rendering, based on the texel, the terrain scene region in the image.

7. A computer device, comprising a memory and one or more processors, the memory storing computer-readable instructions that, when executed by the one or more processors, cause the computer device to perform an image rendering method including:

determining a vertex coordinate of a virtual texture tile corresponding to an image in a virtual texture;

loading, through a vertex shader, a physical texture corresponding to the vertex coordinate to a texture cache;

performing, through a sampling node in the vertex shader, scaling transformation processing on a vertex coordinate of each rendering child tile in the virtual texture tile according to a scaling transformation matrix to obtain a local virtual texture coordinate of each rendering child tile;

determining a starting physical texture coordinate corresponding to the physical texture according to a world coordinate corresponding to the virtual texture tile;

determining the physical texture coordinate corresponding to each rendering child tile in the texture cache according to the local virtual texture coordinate of each rendering child tile and the starting physical texture coordinate corresponding to the physical texture;

transmitting the physical texture coordinate to a pixel shader; and sampling, through the pixel shader, a texel matched with the physical texture coordinate from the physical texture in the texture cache, and rendering, based on the texel, the image.

8. The computer device according to claim 7, wherein the loading, through a vertex shader, the physical texture corresponding to the vertex coordinate to the texture cache comprises:

determining, through the vertex shader, the local virtual texture coordinate of the virtual texture tile corresponding to the vertex coordinate in a virtual texture coordinate system;

obtaining a virtual texture page table, the virtual texture page table storing a mapping relationship between the local virtual texture coordinate and the physical texture coordinate, and the physical texture coordinate being a coordinate of the physical texture in a physical texture coordinate system;

obtaining the physical texture corresponding to each virtual texture tile according to the physical texture coordinate corresponding to the local virtual texture coordinate in the virtual texture page table; and loading the obtained physical texture to the texture cache.

9. The computer device according to claim 8, wherein the obtaining the physical texture corresponding to each virtual texture tile according to the physical texture coordinate corresponding to the local virtual texture coordinate in the virtual texture page table comprises:

determining the physical texture coordinate of the physical texture corresponding to each virtual texture tile in the virtual texture page table according to the local virtual texture coordinate and a virtual texture size of the virtual texture; and obtaining the physical texture corresponding to each virtual texture tile according to the physical texture coordinate.

10. The computer device according to claim 7, wherein the transmitting the physical texture coordinate to the pixel shader comprises:

transmitting, through the sampling node in the vertex shader, the physical texture coordinate to the pixel shader.

11. The computer device according to claim 7, wherein the method further comprises:

determining, through the vertex shader, a texture request parameter corresponding to each virtual texture tile according to the local virtual texture coordinate corresponding to each virtual texture tile; and transmitting, through the vertex shader, the physical texture coordinate and the texture request parameter to the pixel shader, wherein the sampling, through the pixel shader, the texel matched with the physical texture coordinate from the physical texture in the texture cache comprises:

sampling, through the pixel shader, the texel matched with the physical texture coordinate from the physical texture in the texture cache based on the texture request parameter.

12. The computer device according to claim 7, wherein the determining the vertex coordinate of the virtual texture tile corresponding to the image in a virtual texture comprises:

determining, when the image comprises a terrain scene region, the vertex coordinate of the virtual texture tile corresponding to the terrain scene region in the virtual texture; and the sampling, through the pixel shader, a texel matched with the physical texture coordinate from the physical texture in the texture cache and rendering, based on the texel, the image comprises:

sampling, through the pixel shader, the texel matched with the physical texture coordinate from the physical texture in the texture cache, and rendering, based on the texel, the terrain scene region in the image.

13. One or more non-transitory computer-readable storage media, storing computer-readable instructions that, when executed by one or more processors of a computer device, cause the computer device to implement an image rendering method including:

determining a vertex coordinate of a virtual texture tile corresponding to an image in a virtual texture;

loading, through a vertex shader, a physical texture corresponding to the vertex coordinate to a texture cache;

performing, through a sampling node in the vertex shader, scaling transformation processing on a vertex coordinate of each rendering child tile in the virtual texture tile according to a scaling transformation matrix to obtain a local virtual texture coordinate of each rendering child tile;

determining a starting physical texture coordinate corresponding to the physical texture according to a world coordinate corresponding to the virtual texture tile;

determining the physical texture coordinate corresponding to each rendering child tile in the texture cache according to the local virtual texture coordinate of each rendering child tile and the starting physical texture coordinate corresponding to the physical texture;

transmitting the physical texture coordinate to a pixel shader; and sampling, through the pixel shader, a texel matched with the physical texture coordinate from the physical texture in the texture cache, and rendering, based on the texel, the image.

14. The non-transitory computer-readable storage media according to claim 13, wherein the loading, through the vertex shader, the physical texture corresponding to the vertex coordinate to the texture cache comprises:

determining, through the vertex shader, the local virtual texture coordinate of the virtual texture tile corresponding to the vertex coordinate in a virtual texture coordinate system;

obtaining a virtual texture page table, the virtual texture page table storing a mapping relationship between the local virtual texture coordinate and the physical texture coordinate, and the physical texture coordinate being a coordinate of the physical texture in a physical texture coordinate system;

obtaining the physical texture corresponding to each virtual texture tile according to the physical texture coordinate corresponding to the local virtual texture coordinate in the virtual texture page table; and loading the obtained physical texture to the texture cache.

15. The non-transitory computer-readable storage media according to claim 13, wherein the transmitting the physical texture coordinate to the pixel shader comprises:

transmitting, through the sampling node in the vertex shader, the physical texture coordinate to the pixel shader.

16. The non-transitory computer-readable storage media according to claim 13, wherein the method further comprises:

determining, through the vertex shader, a texture request parameter corresponding to each virtual texture tile according to the local virtual texture coordinate corresponding to each virtual texture tile; and transmitting, through the vertex shader, the physical texture coordinate and the texture request parameter to the pixel shader, wherein the sampling, through the pixel shader, the texel matched with the physical texture coordinate from the physical texture in the texture cache comprises:

sampling, through the pixel shader, the texel matched with the physical texture coordinate from the physical texture in the texture cache based on the texture request parameter.

17. The non-transitory computer-readable storage media according to claim 13, wherein the determining the vertex coordinate of the virtual texture tile corresponding to an image in a virtual texture comprises:

determining, when the image comprises a terrain scene region, the vertex coordinate of the virtual texture tile corresponding to the terrain scene region in the virtual texture; and the sampling, through the pixel shader, the texel matched with the physical texture coordinate from the physical texture in the texture cache and rendering, based on the texel, the image comprises:

sampling, through the pixel shader, the texel matched with the physical texture coordinate from the physical texture in the texture cache, and rendering, based on the texel, the terrain scene region in the image.

* * * * *